United States Patent
Dobre et al.

(10) Patent No.: US 12,536,351 B2
(45) Date of Patent: Jan. 27, 2026

(54) MOTION PLANNING

(71) Applicant: Five AI Limited, Cambridge (GB)

(72) Inventors: Mihai Dobre, Edinburgh (GB); Subramanian Ramamoorthy, Edinburgh (GB)

(73) Assignee: Five AI Limited, Cambridge (GB)

( * ) Notice: Subject to any disclaimer, the term of this patent is extended or adjusted under 35 U.S.C. 154(b) by 175 days.

(21) Appl. No.: 18/288,354

(22) PCT Filed: Apr. 29, 2022

(86) PCT No.: PCT/EP2022/061514
§ 371 (c)(1),
(2) Date: Oct. 25, 2023

(87) PCT Pub. No.: WO2022/229404
PCT Pub. Date: Nov. 3, 2022

(65) Prior Publication Data
US 2024/0202393 A1 Jun. 20, 2024

(30) Foreign Application Priority Data
Apr. 30, 2021 (GB) .................................. 2106238

(51) Int. Cl.
*G06F 30/20* (2020.01)
*B60W 60/00* (2020.01)

(52) U.S. Cl.
CPC ......... *G06F 30/20* (2020.01); *B60W 60/0013* (2020.02); *B60W 60/0015* (2020.02); *B60W 2554/4046* (2020.02); *B60W 2556/45* (2020.02)

(58) Field of Classification Search
CPC ............. G06F 30/20; B60W 60/0013; B60W 60/0015; B60W 2554/4046; B60W 2556/45; B60W 30/18163; B60W 60/0011
See application file for complete search history.

(56) References Cited

U.S. PATENT DOCUMENTS

2020/0150672 A1* 5/2020 Naghshvar ............. G06N 3/006

FOREIGN PATENT DOCUMENTS

DE 112018005774 8/2020
EP 3789920 A1 3/2021

OTHER PUBLICATIONS

International Search Report; PCT/EP2022/061514; Date: Aug. 4, 2022; By: Authorized Officer: Plenk, Rupert.
(Continued)

*Primary Examiner* — Brandon D Lee
(74) *Attorney, Agent, or Firm* — Andrew J. Tibbetts; Samuel S. Stone; Greenberg Traurig, LLP

(57) ABSTRACT

A computer-implemented method of planning ego actions for a mobile robot in the presence of at least one agent, comprising: searching for an optimal ego action in multiple search steps, each comprising: selecting an ego action from a set of possible ego actions, selecting an agent behaviour from a set of possible agent behaviours, running a simulation based on the selected ego action and agent behaviour, determining a possible outcome, and assigning a reward to the selected ego action, based on a reward metric, wherein selection of the ego action in later search steps is biased towards higher reward ego action(s) but selection of the agent behaviour in later search steps is biased towards riskier agent behaviour(s), a risky agent behaviour being, according to earlier search steps, more likely to result in a
(Continued)

lower reward outcome and choosing an ego action based on the rewards computed in the search steps.

20 Claims, 10 Drawing Sheets

(56) References Cited

OTHER PUBLICATIONS

Stefano V Albrecht et al, "Interpretable Goal-based Prediction and Planning for Autonomous Driving", arxiv.org, Cornell University Library, 201 Olin Library Cornell University Ithaca, NY 14853,Nov. 4, 2020 (Nov. 4, 2020).

Morris Antonello, Mihai Dobre, Stefano V. Albrecht, John Redford, Subramanian Ramamoorthy, "Flash: Fast and Light Motion Prediction for Autonomous Driving with Bayesian Inverse Planning and Learned Motion Profiles", Apr. 13, 2022 (Apr. 13, 2022), URL:https://arxiv.org/pdf/2203.08251.pdf.

Brewitt, C, Albrecht, SV, Wilhelm, J, Gyevnar, B, Eiras, F, Dobre, M & Ramamoorthy, "Autonomous Driving with Interpretable Goal Recognition andMonte Carlo Tree Search", Jul. 13, 2020 (Jul. 13, 2020), https://www.pure.ed.ac.uk/ws/portalfiles/portal/155859557/Autonomous_driving_with_interpretable_BREWITT_DOA02072020_AFV.pdf.

* cited by examiner

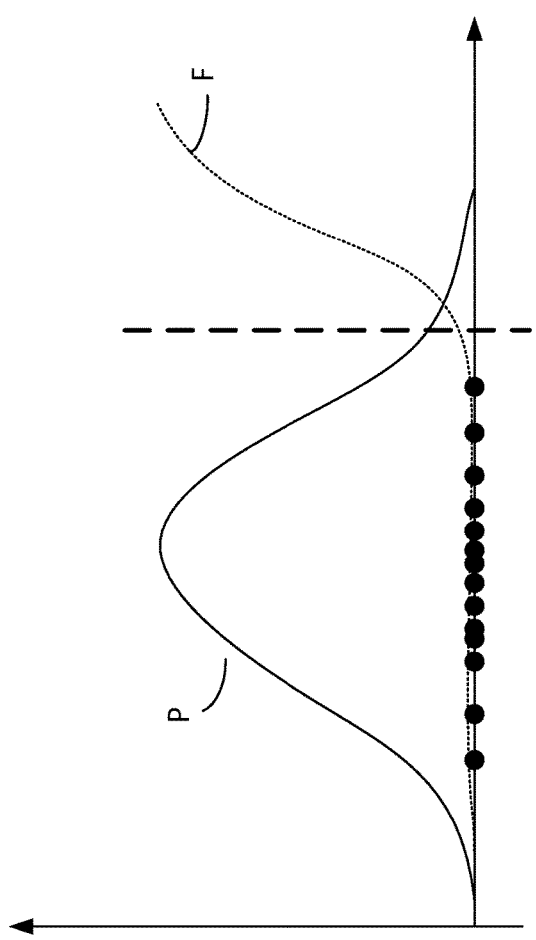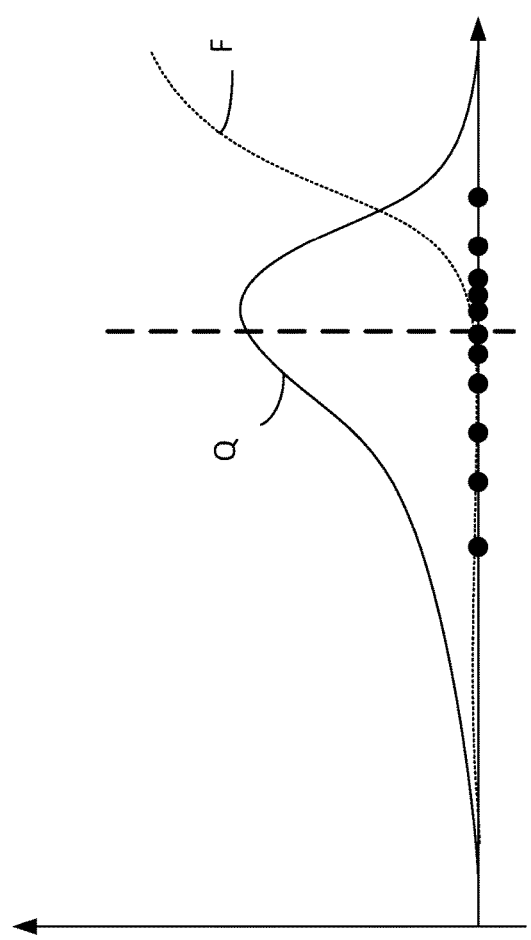

MOTION PLANNING

CROSS-REFERENCE TO RELATED APPLICATIONS

This application is the U.S. National Stage application, pursuant to 35 U.S.C. § 371, of PCT International Patent Application No. PCT/EP2022/061514, filed Apr. 29, 2022, designating the United States and published in English, which claims priority under 35 U.S.C. §§ 119 and 365 to Great Britain Patent Application No. 2106238.5, filed Apr. 30, 2021. The contents of each of the aforementioned applications are incorporated herein by reference in their entirety.

TECHNICAL FIELD

The present detection pertains to motion planning techniques suitable for mobile robots.

BACKGROUND

Autonomous vehicles (AVs) navigating roads in the presence of other road users have a requirement to plan actions so as to minimise the probability of catastrophic events such as collisions. In order to plan its own actions, an AV needs to predict the actions of other road users ('agents').

Multiple methods exist to predict the behaviour of other agents in a driving scenario given observations of the agents' past behaviour. One example method for predicting external agent behaviour uses goal recognition, which determines, based on an observed trajectory of an agent, a goal, which may be deterministic or alternatively sampled from a probabilistic goal distribution, for that agent, and predicts a trajectory for that agent towards the sampled goal. Selected actions of the AV can be assessed against the predictions by simulating the AV and external agent behaviours.

Other mobile robots with complex planning requirements are also being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed.

Most methods of planning and prediction work within a resource budget, such that it is not possible to enumerate all possible prediction outcomes for other agents at any given time, so that the best action can be chosen by the autonomous vehicle.

Albrecht et al. 'Interpretable Goal-based Prediction and Planning for Autonomous Driving' proposes an integrated planning and prediction system for autonomous driving which uses a technique known as inverse planning to recognise the goals of external agents. Goal recognition is used to inform a Monte Carlo Tree Search (MCTS) algorithm to plan optimal maneuvers for the ego vehicle.

The Monte Carlo Tree Search algorithm of Albrecht et al. first samples a current maneuver for the non-ego agents of the given scenario, and then samples possible goals of the agents of the scene from a set of possible goals, with the sampling based on a framework of rational inverse planning applied to the current state of the system and the current maneuver. For the sampled goal, a predicted trajectory for each agent is sampled from a distribution over possible agent trajectories (or behaviours). An action may be selected for the ego vehicle from a set of possible ego actions. 'Macro' actions comprising multiple maneuvers may be selected and simulated for the ego vehicle, with external agents following their sampled trajectories until the end of the macro action. Rewards are received for each selected action based on the outcome of the simulation.

The reward is based on trajectory execution time, longitudinal and lateral jerk, path curvature and safety distance to leading vehicle. An upper confidence bound exploration technique (UCB1) is used to select an ego macro action for each simulation. UCB1 biases the search towards ego trajectories with the highest reward, prioritizing regions of the search space that are most promising with respect to the aforementioned reward criteria. Forward-simulation of trajectories uses a combination of proportional control and adaptive cruise control to control a vehicle's acceleration and steering.

SUMMARY

The present disclosure pertains generally to the planning of ego actions, in the presence of at least one agent. As noted, certain existing motion planning methods use a probabilistic search method (e.g. Monte Carlo Tree Search) to explore different possible futures. In such methods, an ego action is selected in each step and possible outcomes of that action are simulated to assess the suitability of that ego action (e.g. whether or not that ego action and that agent behaviour result in a collision). There is typically uncertainty in the future behaviour of the agent(s), which can be accommodated by sampling the possible agent behaviour from an appropriate distribution encoding that uncertainty. Over the course of multiple steps, different possible ego actions are selected, and different possible agent behaviours are explored for each ego action in simulation, with the aim of selecting some optimal ego action once all steps have completed.

In such approaches, less probable agent behaviours are less likely to be sampled, and are therefore less likely to be explored in simulation. A problem can arise if there are high-risk agent behaviours that are relatively unlikely but nevertheless possible. To be confident that such behaviours have been explored sufficiently, the method needs to be performed over a large number of steps, each requiring significant computational resources. Robustness to high risk but low probability agent behaviours is thus provided by performing the method over a sufficiently large number of steps.

For example, in Albrecht et al., in each search step, each non-ego trajectory is sampled according to a probability distribution computed via goal-based prediction. Over some initial number of simulations, a particular ego (macro-) action may be rewarded relatively highly overall, when assessed against the non-ego trajectories that happened to be sampled in those initial simulations. However, further simulations may result in the sampling of less likely non-ego trajectories that result in much less favourable outcomes for that ego action, and therefore a lower overall reward, eventually pushing the search towards other ego action(s). If the search is terminated before that point, the risk is that, ultimately, a non-optimal ego action is selected. One way to reduce that risk would be to increase the number of simulations and the number of other agent behaviours are sampled, at the expense of increased computational resource requirements.

An aim herein is to provide a given level of robustness to high risk but low probability agent behaviours, but with a reduced number of steps (and thus reduced computational resources) compared to existing methods.

A first aspect disclosed herein provides a computer-implemented method of planning ego actions for a mobile robot in the presence of at least one dynamic agent, the method comprising:

searching for an optimal ego action of a set of possible ego actions in multiple search steps, each search step comprising:
selecting an ego action from the set of possible ego actions,
selecting an agent behaviour from a set of possible agent behaviours,
running an online simulation based on the selected ego action and agent behaviour, and thereby determining a possible outcome of the selected agent behaviour and ego action, and
assigning a reward to the selected ego action, based on a reward metric applied to the determined outcome, wherein the selection of the ego action in later search steps is biased, based on the determined outcomes of earlier search steps, towards higher reward ego action(s) but the selection of the agent behaviour in the later search steps is biased towards riskier agent behaviour(s), a risky agent behaviour being an agent behaviour that is, according to the earlier search steps, more likely to result in a lower reward outcome for the selected ego action; and
choosing an ego action of the set of possible ego actions, based on the rewards computed in the search steps.

The search remains biased towards the most promising ego actions; however this is counterbalanced by the biasing of the agent behaviours towards the most 'pessimistic' outcomes. This reduces the number of possible other agent behaviours that need to be considered in order to achieve a minimum level of robustness. The described embodiments implement the method based on risk-aware sampling of probability distribution(s) defined over possible behaviours of one or more other agents.

The selection of ego action and the selection of agent behaviours may be based on the same reward metric, or different reward metrics. For example, the agent distribution may be based on rewards considering only collision risk while the ego actions may be selected based on rewards considering other factor(s) such as comfort and/or progress towards a defined goal. A combination of multiple metrics could be used.

Each agent behaviour may be associated with an agent-ego risk score specific to the selected ego action, and the selection of the agent behaviour may be biased towards riskier behaviour(s) according to the agent-ego risk scores specific to the selected ego action, the agent-risk score for each agent behaviour and ego action being updated based on further selection and simulation of that agent behaviour and that ego action in the later search steps. The selection of the ego action may be biased towards higher reward ego action(s) based on an ego score, the ego score being updated based on further selection and simulation of that ego action in the later search steps.

A lower confidence bound of the ego score may be used to bias the selection of ego actions towards those actions which were selected less often in previous search steps.

An upper confidence bound of the agent-ego risk score may be used to bias the selection of agent behaviours towards those behaviours which were selected less often in previous search steps.

The selection of the agent behaviour may comprise sampling a behaviour from an importance distribution over the set of possible agent behaviours, the importance distribution biased such that riskier behaviours are more likely to be sampled.

The method may further comprise determining a prediction distribution over possible agent behaviours, wherein the importance distribution is based on the prediction distribution and the agent-ego risk scores for the set of possible agent behaviours.

Different rewards may be assigned, in different search steps, to the same ego action for the same sampled agent behaviour, as a consequence of prediction uncertainty and/or perception uncertainty.

The reward may additionally depend on a further ego action selected in the search step and/or a further agent behaviour sampled in the search step, whereby different rewards may be assigned, in different search steps, to the same ego action for the same sampled agent behaviour as a consequence of selecting different further ego actions and/or sampling different further agent behaviours.

The reward may be assigned based on backpropagation.

The selection of the ego action in the selection step may be biased towards ego actions observed more often in the search steps, by minimising an upper confidence bound of a risk score based on the computed reward(s) for that ego action.

The method may further comprise providing the chosen ego action, to a controller and generating, by the controller, a control signal for implementing the chosen ego action, wherein the control signal is inputted to an actor system of a mobile robot or a vehicle dynamics model for modelling a response of a mobile robot to the control signal in simulation.

The agent-ego risk score and the ego score may each be updated based on the same reward.

The agent-ego risk score may be updated based on a first reward computed using a first reward metric and the ego score may be updated based on a second reward computed using a second reward metric.

The first reward metric may measure at least collision risk, and the second reward metric may measure at least one additional factor such as comfort or progress towards a defined goal.

The ego score may be updated as:

$$CVaR_i = \frac{1}{n_i(1-\alpha)} \sum_k w^{(k)} * r_i^{(k)} \mathbb{1}\{r_i^{(k)} \leq VaR_i\},$$

where $\alpha$ is a predetermined percentile, $VaR_i$ is a reward threshold for the ego score, $w^{(k)}$ is a ratio of the probability of the agent behaviours sampled in the $k^{th}$ search step under a natural distribution and the importance distribution, $r_i^{(k)}$ is the (second) reward, $n_i$ is a number of reward observations for i, and the sum is over all reward observations for i.

The agent-ego risk score may be updated based on the following summation:

$$CVaR_{ij} = \frac{1}{n_{ij}(1-\alpha)} \sum_k w^{(k)} * r_{ij}^{(k)} \mathbb{1}\{r_{ij}^{(k)} \leq VaR_{ij}\},$$

wherein $r_{ij}^{(k)}$ is the (first) reward, which may or may not be equal to the (second) reward $r_i^{(k)}$, $n_{ij}$ is a number of reward observations for i, j, and $VaR_{ij}$ is a reward threshold, and the sum is over all reward observations for i, j.

Batch updates may be applied to the ego score, each batch update taking into account multiple search steps In certain applications, such as autonomous driving, "risk" of agent behaviours may be assessed solely or partially on collision risk (risk of a collision outcome between the ego agent and the other agent). In searching for other ego actions, other factor(s) (such as comfort or progress) may be considered. Those other factor(s) may or may not be considered when evaluating the riskiness of agent behaviours. For example, distributions over the behaviours of the other agent(s) may be affected by the collision risk posed to the ego agent.

Another aspect herein is directed computer-implemented method of planning ego actions for a mobile robot in the presence of at least one dynamic agent, the method comprising:
 searching for an optimal ego action of a set of possible ego actions in multiple search steps, each search step comprising:
  selecting an ego action from a set of possible ego actions,
  selecting an agent behaviour from a set of possible agent behaviours,
  running an online simulation based on the selected ego action and agent behaviour, and thereby determining a possible outcome of the selected agent behaviour and ego action, and
  assigning a reward to the selected ego action, based on a reward metric applied to the determined outcome, wherein the selection of the ego action in later search steps is biased, based on the determined outcomes of earlier search steps, towards higher reward ego action(s) but the selection of the agent behaviour in the later search steps is biased towards riskier agent behaviour(s), a risky agent behaviour being an agent behaviour that is, according to the earlier search steps, more likely to result in a collision outcome; and
 choosing an ego action of the set of possible ego actions, based on the rewards computed in the search steps.

A further aspect herein provides a computer system comprising one or more computers configured to implement any of the methods disclosed herein.

The computer system may be embodied in a mobile robot and coupled to a sensor system and actor system of the mobile robot.

The one or more computers may be configured to implement:
 an off-board simulator configured to provide simulated inputs of a simulated scenario, the computer system configured to apply the method to the simulated inputs; and
 a test oracle configured to generate at least one test result for assessing the performance of the method in the simulated scenario.

A further aspect herein provides a computer program for programming a computer system to implement any of the methods disclosed herein.

BRIEF DESCRIPTION OF FIGURES

For a better understanding of the present invention, and to show how embodiments of the same may be carried into effect, reference is made to the following figures in which:
FIG. 3A shows an example natural distribution over agent behaviours;
FIG. 3B shows an example risk-aware distribution over agent behaviours.

DETAILED DESCRIPTION

Figure 1:
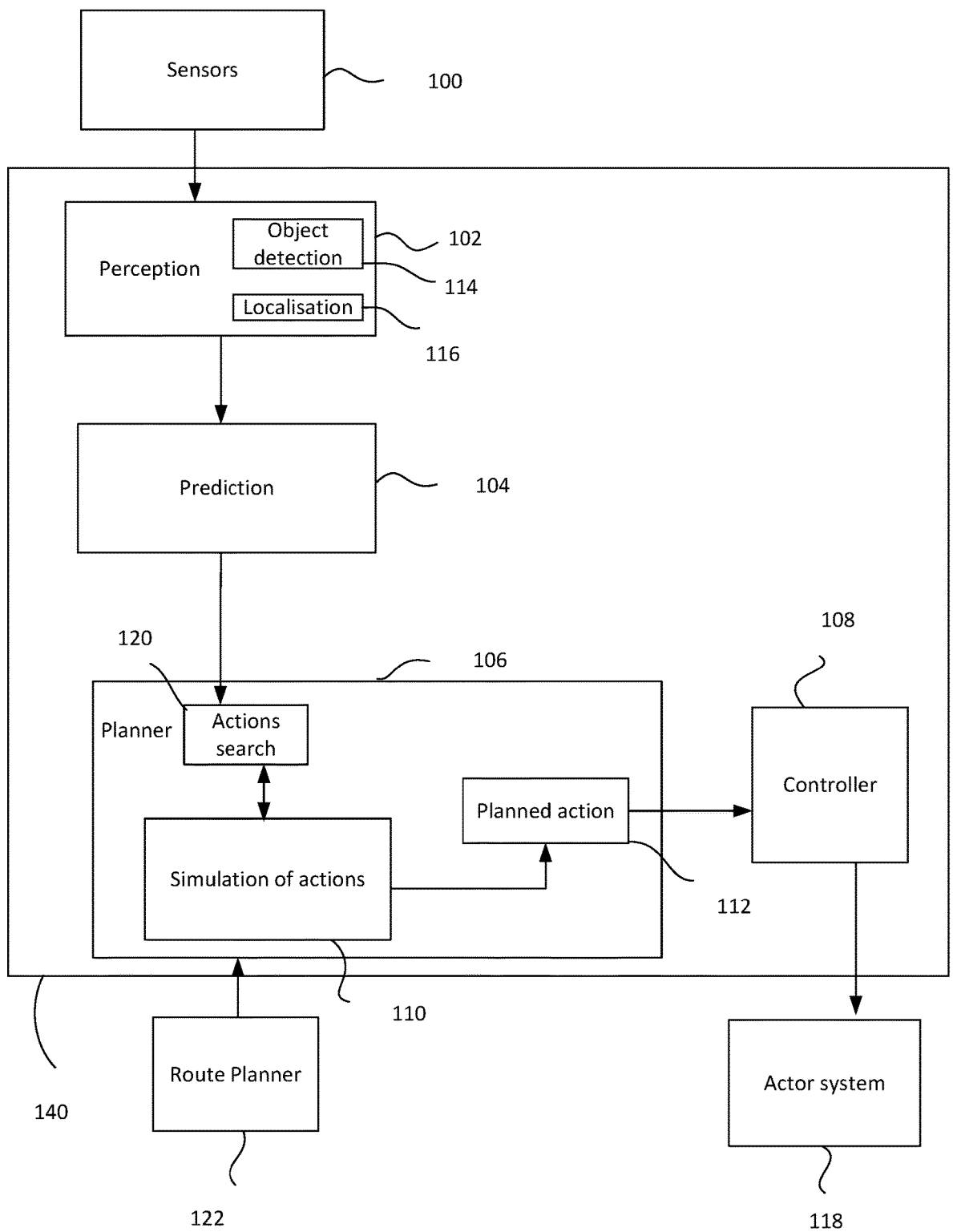
FIG. 1 shows a schematic block diagram showing components of an autonomous vehicle stack.

Noise and uncertainty in the perception of an environment affects an AV system's ability to predict the actions of agents in the environment, and therefore makes it difficult for a planner to determine best actions for the AV (the ego vehicle) to progress safely towards goals. To address this, prediction of agent behaviours may be treated probabilistically, such that predictions take into account perception uncertainty. A prediction component of an AV system may determine, as a prediction output, a probability distribution over a set of possible agent trajectories. In planning, ego actions may be assessed against probabilistic predictions by sampling this distribution over possible agent behaviours and evaluating the ego vehicle actions in simulations with the sampled agent behaviour to determine a 'best' action according to some predefined criteria.

Note that references to an ego 'action' may refer to ego planning at multiple levels of granularity. For example, an action may be chosen to follow a lane with a given acceleration value for a short period of time. Alternatively, an ego action may represent a full maneuver of the ego vehicle such as a lane change. In the following description, an ego action here refers to a decision point for an ego vehicle in the context of planning. The actions of the ego vehicle may be also referred to herein as 'decisions'. In the below description an 'agent behaviour' refers to a possible observed trajectory of the agent. In simulation, where the same agent behaviour may be selected over multiple iterations (search steps), the actual state of the agent which is evaluated against the given ego action may vary over these iterations due to uncertainty in perception.

One problem when sampling predicted behaviours for the agents of the scene is that there is no way to guarantee that the most 'important' agent behaviours are sampled, where 'importance' herein refers to those behaviours which have the biggest effect on the scenario based on some reward metric. Rewards are typically defined to reward safe driving and penalise driving that results in adverse outcomes such as collisions, but rewards may also incorporate other factors such as progress and comfort. Rewards may be computed based on a variety of metrics that can be computed for a given scenario, including velocity, acceleration and/or jerk of an ego vehicle, as well as distances between an ego vehicle and other agents of the scenario. Given the requirement for AVs to comply with strict safety regulations, it is important that the planner is aware of potentially catastrophic outcomes before choosing an ego action. This must be balanced against the finite computational resources available for planning in a practical context. An important problem is to find a way of sampling predicted agent behaviours within a fixed planning budget such that those behaviours that are likely to lead to catastrophic events are more likely to be sampled, so that the planner is 'aware' of the dangerous outcomes of potential ego actions before making a planning decision.

When sampling a subset from a prediction distribution over agent behaviours computed by a prediction component based on the perceived scene, the ego planner may never encounter, for a given ego action, a predicted agent behaviour that leads to an adverse event. The expected reward for this action would therefore be high. This may cause the ego planner to choose this as a next action. However, there may be a subset of agent behaviours that are rare according to the prediction distribution, but for which the given action may lead to a catastrophic event. The planner cannot take these rare events into consideration if they are not encountered during sampling, and thus the planner makes decisions without knowledge of many negative potential outcomes. Note that the prediction distribution as computed by a prediction component may also be referred to herein as the 'natural' distribution over agent behaviours.

When sampling within a certain budget, it is desirable to become aware of those agent behaviours that are most likely to lead to catastrophic events, such that the ego vehicle can assess each possible action with as much knowledge as possible of the risk of each action. However, there is also a requirement not to waste resources on assessing ego actions against a variety of agent behaviours if the given ego actions are known to lead to adverse outcomes. This leads to a trade-off, known in the field of reinforcement learning as the exploration-exploitation trade-off. Exploitation refers to the use of knowledge the system has already gained. In an example of a high-exploitation strategy, if an ego planner has assessed a given ego action against a small number of sampled agent behaviours, and had a favourable outcome, the planner may simply characterise this action as a good one without exploring the outcomes of other actions. Exploration in this context refers to sampling a wide range of ego actions and agent behaviours and assessing each combination. While exploration enables the system to find a more optimal solution, undirected exploration of actions would lead to significant use of resources on ego actions that are known to lead to worse outcomes. Effective search strategies typically employ a combination of exploration and exploitation. The described embodiments provide a method of planning and prediction for autonomous vehicles that samples agent behaviours in a risk-aware way. At each planning step, an ego action is chosen to minimise an estimated risk resulting from that action, and a predicted behaviour for external agents is sampled from a 'risk-aware' distribution such that agent behaviours that contribute more to the expected risk of an action according to the given risk measure are more likely to be selected.

Both the choice of ego action and the risk-aware distribution may be dependent on what has been previously sampled by the planner as well as the estimated risk resulting from those actions and behaviours. For example, ego actions which have not been selected often are more likely to be chosen for evaluation at a given step than ego actions which have been chosen and evaluated more often, assuming the actions have the same estimated risk. Estimated risk to the ego vehicle may be measured based on one or more reward metrics.

Similarly, the risk-aware distribution over agent behaviours is dependent on how often each given behaviour has been sampled before, where those behaviours which have been sampled less often are adjusted so that they are more likely to be sampled in future. This is to encourage the system more towards exploration of different outcomes.

The method described below has the advantage that it makes the ego planner more robust to noise and uncertainty in perception and prediction, as errors due to uncertainty and noise in observations can be modelled and considered in planning decisions, while maintaining a budget on planning resources. Ego motion is planned based on probabilistic predictions of agent behaviours with an awareness of potential risk to the ego vehicle according to a defined risk measure.

First, the components of an example AV stack and an example of a driving scenario will be described to provide more context to the present invention.

FIG. 1 shows a schematic block diagram of components of an autonomous vehicle stack. The stack comprises one or more sensors 100, a perception module 102, a prediction module 104, a planner 106, and a controller 108.

The perception module 102 receives sensor outputs from sensors 100 of the AV.

The sensor system 100 can take different forms but generally comprises a variety of sensors such as image capture devices (cameras/optical sensors), LiDAR and/or RADAR unit(s), satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and any external actors (vehicles, pedestrians, cyclists etc.) within that environment.

Hence, the sensor outputs typically comprise sensor data of multiple sensor modalities such as stereo images from one or more stereo optical sensors, LiDAR, RADAR etc.

The perception module 102 comprises multiple perception components, for example an object detection component 114 and localisation component 116, which co-operate to interpret the sensor outputs and thereby provide perception outputs to the prediction module 104.

The perception outputs from the perception module 102 are used by the prediction module 104 to predict future behaviour of the non-ego agents of the scene. The prediction module 104 may, for example, compute a probability distribution over possible agent behaviours at a given time, given a set of perception outputs capturing the past behaviour of the agents. This probability distribution may take into account uncertainty in the perception output due to sensor errors or noise. Methods for determining a distribution over agent behaviours may consider agent goals based on scenario information. These will not be described in detail herein. Examples of such methods are described, for example, in Albrecht et al. 'Interpretable Goal-based Prediction and Planning for Autonomous Driving'.

Predictions computed by the prediction module 104 are provided to the planner 106, which uses the predictions to make autonomous driving decisions to be executed by the AV in a way that takes into account the predicted behaviour of the external actors. In the example of FIG. 1, the planner 106 comprises an action search component 120 which searches for a next ego action and a simulation component 110 which simulates the searched ego actions and samples a set of behaviours for other agents in the given scene from a distribution received from the prediction module 104, and evaluates the simulated ego actions at any given time against the sampled agent behaviours using one or more metrics to determine a best action 112. The simulation component continuously feeds back the evaluated risk metrics to the action search component 120 to guide the searches at subsequent iterations (search steps) towards exploring the most useful ego actions according to a given risk metric, described in more detail later.

A route planner 122 provides a goal for the ego vehicle towards which its actions should be planned. The planner 106 aims to determine an ego action or sequence of ego actions to achieve a goal specified by the route planner 122 in a substantially optimal manner. As described above, there are strict requirements for autonomous vehicles to act within a set of stringent safety regulations. A method of determining a 'best' ego action may consider metrics relating to progress towards the given goal as well as metrics relating to safety, comfort and/or other factors. Possible factors to be considered in determining a best ego action are discussed in more detail later.

Once a 'best' ego action 112 has been determined, this is passed to a controller module 108, which executes the decisions taken by the planner 106 by providing suitable control signals to on-board motors of the AV. In particular, the planner 106 plans actions to be taken by the AV and the controller 108 generates control signals in order to execute those actions.

An actor system 118 receives the control signals from the controller 108 and maneuvers the vehicle to execute the actions selected by the planner. The actor system 118 may, for example, comprise drive-by-wire steering motors, and a throttle and brake control system.

Figure 2:
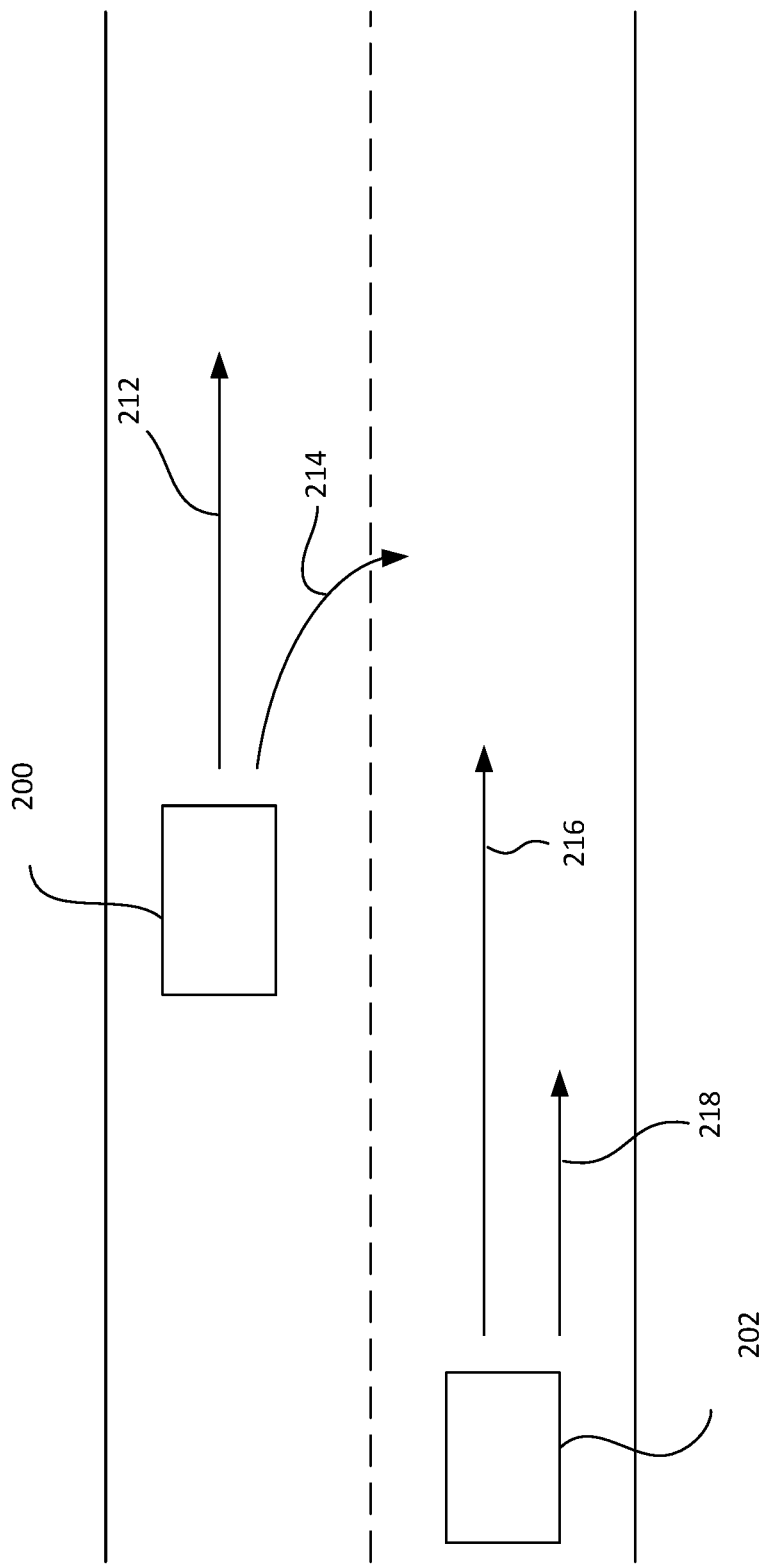
FIG. 2 shows an example diagram of an ego vehicle driving in the presence of an external agent.

FIG. 2 shows an example driving scenario in which an ego vehicle 200 is travelling along a road in one lane and an external agent 202 is driving behind the ego vehicle in a neighbouring lane. FIG. 2 shows an example set of decisions that are possible for the ego vehicle at the current time step. One possible action for the ego vehicle is to maintain the same course, as shown by the straight arrow 212 ahead. A second possible action is to maneuver into the neighbouring lane, denoted by the arrow 214. Note that the set of actions available to the ego vehicle at any given time may be determined by a trajectory generator which evaluates the layout of the scenario including the ego vehicle and other agents and assesses what actions are possible within the physical constraints of the scenario. This trajectory generator does not analyse possible actions or agent behaviours beyond physical feasibility. The planner 106 uses this set of agent behaviours and ego actions as the space to explore and evaluate in order to decide a next ego action.

However, the ego planner 106 must also take into account safety considerations involving the agent 202. In the simplified example of FIG. 2, the agent is shown as having two possible behaviours as provided by the trajectory generator. According to one possibility, the agent continues along its current path at the same speed, as shown by the long arrow 216 indicating the distance covered within a fixed time period from the current time. According to a second possibility, the agent continues along its current path and decelerates, as shown by the shorter arrow 214 in FIG. 2.

As described above, the prediction module 104 determines, based on perceived behaviours of the agent 202 up to the given time point, a prediction for the agent, which may be in the form of a probability distribution over the possible behaviours. In this simplified case, there are two possible behaviours of the agent, so a distribution over these two possibilities would assign a probability value to each behaviour. The planner may then use this probability distribution over predicted trajectories to assess each ego action, by sampling trajectories from the distribution and evaluating potential ego actions for each sampled trajectory using a reward function. The reward function may be based on one or more metrics which may be computed for the state of the ego vehicle and its environment for the chosen action, such as the distance of the vehicle to other agents, and/or metrics evaluating the ego vehicle's progress towards a goal. Rewards may be defined and computed in multiple ways, and possible reward functions will be discussed in more detail below.

Note that the example scenario in FIG. 2 is simplified for clarity. In real driving scenarios, there are typically a large number of possible agent behaviours, and a greater number of agents for which behaviours need to be sampled. In the simple example of FIG. 2, it would be straightforward to enumerate all possible combinations of ego actions and agent behaviours in order to determine a best ego action. However, as the number of ego actions and agent behaviours increases, the number of possible combinations increases exponentially, such that it becomes impossible for a planner of the AV, which is limited in time and resources, to compute an optimal ego action by enumerating possible outcomes. Therefore, in practice the planner samples only a subset of the possible agent behaviours and evaluates potential ego actions against this sampled subset. Furthermore, even if all possible ego actions and agent behaviours could be enumerated, the reward for the same ego action and external agent behaviours may differ to account for uncertainty in perception and/or localisation, such that simulating the same ego action and agent behaviour multiple times yields different results.

The methods described below may be applied to a variety of driving scenarios involving an ego vehicle and one or more external agents. These methods are particularly useful in cases where external agents have multiple distinct possible goals. These include, for example: roundabout merging, where agents on the roundabout have multiple possible exits, junction handling, in which agents have multiple roads they can take, and highway merging, where agents can switch lanes.

Importance Sampling

As mentioned above, direct sampling of the distribution determined by the prediction module 104 leads to a problem for planning ego actions. A simulated ego action may be evaluated against a set of sampled agent behaviours from a prediction distribution, and it may be found to lead to positive outcomes according to some reward metric for those sampled behaviours, even if there are some unsampled agent behaviours for which that ego action is likely to lead to an adverse event such as a collision. Because the planner is 'unaware' of these agent behaviours, not having sampled them, the ego action may be chosen as the best possible action and the ego vehicle may begin a maneuver which is potentially dangerous. For safety, any risk of collision should be weighted heavily in planning decisions and therefore awareness of those actions which may lead to adverse outcomes is important. Under limited resources, this may be achieved by increasing the likelihood of sampling those agent behaviours that can lead to adverse outcomes.

Methods will now be described to sample agent behaviours for evaluation by a planner 106 such that behaviours that are high-risk according to some risk measure are prioritised in sampling. The below description explains how agent behaviours may be sampled from an importance distribution which prioritises a given risk measure. However, as noted above, the predicted agent behaviours determined by the prediction stack 104 may be based on a goal determined for the given agent. In some embodiments, the agent goal may be sampled from an importance distribution. Therefore, either or both of agent goals and agent behaviours may be sampled from an importance distribution.

Herein, "risk" is assessed from an ego agent's perspective, and relates to the concept of "rewards" in planning: the planner 106 aims to find a high reward ego action, and a "risky" agent behaviour is an agent behaviour more likely to result in a lower reward for a given ego action. For the avoidance of doubt, the term risk does not necessarily imply a narrow consideration of collision risk, and can refer more generally to any undesired outcome (and can encompass other factors such as comfort and/or progress, in addition to or instead of collision risk). In the examples below, risk is assessed in respect of ego action-agent behaviour pairs, over the course of multiple search steps. In the examples below, an agent behaviour represents the behaviour of a single agent of a scene. However, note that an agent behaviour may define the behaviour of more than one agent, and various behaviours comprising combinations of agent actions for the multiple agents of the scene may be assessed for the given ego action. Unless otherwise indicated, an ego action is generally denoted by index i whilst an agent behaviour is generally denoted by index j, with risk evaluated in respect of a given i, j pairing.

As described above, an issue with the 'natural' predicted distribution over agent behaviours, determined by a prediction module 104 based on received perception outputs, is that within a limited sampling budget, rare agent behaviours that lead to adverse events may not be encountered during sampling, which may lead the planner to select an ego action that is potentially dangerous. To address this problem, the planner can instead sample from a different distribution, defined such that the more 'important' agent behaviours are more likely, where 'important' is defined herein to refer to behaviours which are 'riskier' according to a defined risk measure. This technique may be referred to generally as 'importance sampling'. Importance sampling will first be described for the example case of sampling agent behaviours for planning ego actions, to illustrate the concept as it applies to planning in an AV stack. More specific implementations of this concept in the context of the present invention are described later.

FIG. 3A shows a graph illustrating how an expected value for a function F, which may be, for example, a risk measure of the given agent behaviour for the ego action being evaluated. To evaluate the given ego action, an expected value of the risk is estimated by sampling from a distribution P over agent behaviours and computing the risk for each sampled behaviour.

The function F is shown in dashed lines. FIG. 3A shows that the function is very low across most of the behaviour distribution, and increases significantly towards a tail of the behaviour distribution. This indicates that a subset of behaviours that are unlikely according to the 'natural' behaviour distribution P contribute significantly to the expected value for the function F. If, for example, the function F represents some measure of the risk of adverse events, this leads to the problem pointed out above of sampling under a fixed budget. When determining the expected value of the function F based on sampling, there is a chance that none of the behaviours to the right of the dashed line is sampled, as shown by an example set of sampled points shown in FIG. 3. The expectation computed for F for this example set of sampled points is therefore lower than the real risk for the given ego action over all possible agent behaviours. This leads to possibly unsafe planning decisions based on a low computed risk, where the real safety risk is much higher.

FIG. 3B shows the principle of importance sampling, where a new distribution Q over behaviours is defined which is sampled from in order to estimate an expected value for the function F. This distribution Q shown in FIG. 3B is chosen such that sampling from Q results in sampling more instances for which the function F takes large values. It is important to note that the expected value of a function F under the distribution Q is not equal to the expected value of the same risk function under the 'natural' distribution P, which in our example is a value characterising some risk measure of a given ego action. This is because riskier behaviours are over-represented in the distribution Q, leading to a biased estimation of the overall risk. However, this may be addressed by applying weights to the risk values computed for the sampled behaviours, with the weight for each sample being proportional to the ratio of probabilities of that sampled behaviour under the original distribution P and the importance distribution Q. Therefore, an unbiased estimate may be computed for the risk function F which ensures that risky behaviours are adequately sampled even within a fixed sampling budget.

The above description is merely an illustration of the concept of importance sampling. Note that in the above example the function F is described as a measure of risk of adverse events. However, the same principle applies to estimating a reward function for each ego action, where it is important to adequately sample from those behaviours that lead to minimal rewards. As mentioned above 'risk' as used herein refers to a measure of loss of reward, which can be derived from a reward function. Example planning methods described later use a distribution Q which is adapted according to the risk seen in sampled behaviours, rather than defining a static distribution Q for each ego action. It is also important to note that in planning, the risk being estimated is not a deterministic function of behaviours which is known in advance. Instead, the function F is learned during planning and/or is non-deterministic. For example, the risk function may be based on a reward computed from a simulation of possible vehicle behaviours in a scenario, with the simulation taking uncertainty in perception and/or localisation into account.

Multi-Arm Bandit Algorithm

As has already been described, the planner uses predicted agent behaviours to make ego decisions by assessing the future outcomes resulting from said actions against one or more metrics. The planner may predict multiple steps into the future, at each step evaluating possible ego actions against predicted agent behaviours. This multi-step exploration of possible ego actions and different predicted agent behaviours may be carried out using a Monte Carlo Tree Search algorithm. Predicting multiple 'steps' into the future may make the planner more efficient at reaching the ego goals by making more long-term decisions rather than making decisions that appear optimal in the short-term. Note that, as mentioned above, a single 'step' may represent actions having different levels of granularity. For example, each step or node of a Monte Carlo tree may represent a 'macro' action of the ego vehicle representing a larger maneuver which comprises many smaller actions such as changes in direction, velocity and acceleration. In general, at each 'step' in the tree, the ego action and agent behaviour each represent some subsection of a trajectory, which can be of any size. The planning of a next ego action can occur at any time, and planning may, for example, be initiated at regular time intervals. Each instance at which the planner is called to carry out the steps described herein to plan a next ego action may be referred to herein as a 'planning step'.

However, the number of possible ego actions to be evaluated grows exponentially as the 'depth' of the prediction into the future increases, which may cause difficulties under a limited planning budget. Therefore the planner may confine the search over future actions and behaviours to some fixed depth, computing a reward based on metrics computed for each possible ego action at a given timestep based on the predicted agent behaviours and future actions computed only for the fixed number of steps into the future.

A planning scheme which considers only the immediate next action of the ego vehicle and the next behaviour of the external agents of the scenario in order to compute a reward may be formulated as a multi-armed bandit to allocate planning resources to explore the ego actions with the best outcomes as much as possible before making a decision.

A simple version of the multi-armed bandit problem may be defined as follows. An agent has to choose from among a number of choices with the goal of maximising a reward, but the agent is not initially aware of the potential loss or reward of each choice. The agent has some limit on time or resources so that it cannot exhaustively test the rewards or losses received for each choice. Each choice or 'arm' has an associated distribution representing the rewards received by opting for that arm. At each step within a limited number of steps defined for the given budget, a single arm is chosen, and a reward is collected from the distribution associated with that arm. Before any arms are chosen, the system may have no knowledge of the rewards available from each arm. As rewards are received at each arm, the system builds some knowledge of the rewards associated with each arm, and determine an estimated value for that arm. As described earlier, there is a trade-off when deciding which arm to choose at each step, between using the knowledge gained already and the possibility of finding higher rewards by trying more choices, even if some of these choices lead to lower rewards. The goal of the multi-armed bandit problem is to maximise the total rewards collected for the given budget of iterations. Note that the term 'agent' as used above in the context of the definition of a multi-armed bandit problem is a general term for a decision-making entity, and not to be confused with the external agents of a driving scenario described elsewhere herein.

The above-described formulation may be applied to choosing ego actions by a planner to be evaluated against predicted agent behaviours. In this case, it is useful for the planner to assess ego actions that lead to high rewards, such that resources are not wasted evaluating ego actions that are risky.

However, when planning actions for an ego vehicle, the reward for each action depends also on the behaviour of other agents of the scene. The planner needs to learn how to make the best choice of ego action in the context of the predicted behaviour of other agents of the scene.

An embodiment will now be described which uses a multi-armed bandit formulation in combination with the principle of importance sampling in order to explore future ego actions in a 'risk-aware' way.

Figure 4:
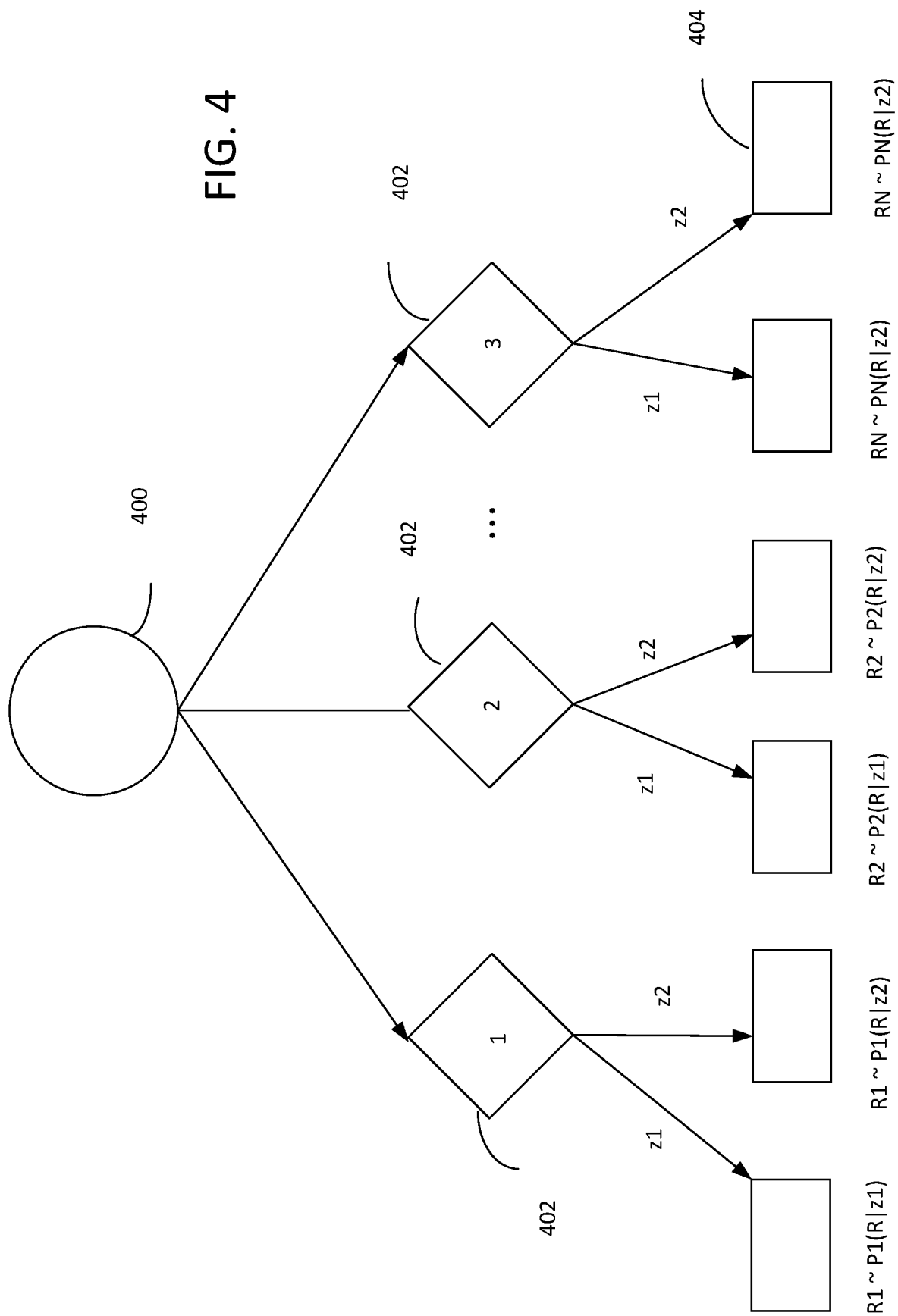
FIG. 4 shows a graph illustrating a multi-armed bandit approach to planning.

FIG. 4 shows an example graph showing a multi-armed bandit scheme for planning actions of an ego vehicle at a timestep t. A central node 400 at a top layer represents the current state of the scenario, with a number of branches or arms from this node representing possible ego actions as determined by a trajectory planner based on the physical constraints of the scenario in its current state. The planner may select an arm according to a policy that minimises a current estimate of a risk measure for that arm at each of multiple iterations while inside a planning budget. This policy and risk measure will be described in more detail later. In the same iteration, the prediction of agent behaviours may be sampled, where ego behaviours 402 are shown as nodes in the second level of FIG. 4. Using the principle of importance sampling described above, agent behaviours may be sampled from a different distribution Q to the 'natural' distribution P obtained from the prediction module 104. Q may be chosen such that behaviours leading to an increased risk measure are more likely. A reward is then observed for the given ego action and sampled agent behaviour. Note that the rewards are determined by simulating the selected ego action and agent behaviour, and may vary for the same agent and ego behaviours due to perception uncertainty. For example, the actual state of the agent is subject to errors in perception, so the same sampled agent behaviour can result in different agent trajectories in simulation, leading to different possible rewards. Sources of uncertainty affecting the observed rewards are described in more detail later. The rewards may be represented as an uncertainty distribution 404, as shown in the third level of FIG. 4. However, it is important to note that the underlying distribution over rewards is not known during planning. The received reward $r_i$ is used to update the estimated risk measure for the given ego action.

The algorithm for planning a next ego action may be described in pseudocode as follows:
Repeat while in budget:
    Select arm i to optimistically minimise estimated risk measure
    Sample agent behaviour $z_j \sim Q_i(Z)$
    Receive reward
    Update risk measure estimate
    Update importance distribution $Q_i(Z)$
Select arm i to conservatively minimise risk measure.

In the examples described below, a single reward value is observed for each simulation, and ego actions and agent behaviours are both selected based on the same risk measure. However, in embodiments, the risk measure used to select ego action i at each step may be different to the risk measure used to determine the distribution Q from which the agent behaviours are sampled. The rewards received at each iteration of the above planning algorithm may comprise a set of multiple reward metrics, and different risk measures may be defined based on these reward metrics. For example, agent behaviours may be sampled in a way that is only concerned about collision risk to the ego vehicle, where ego actions may be selected such that other factors such as comfort or progress are also rewarded.

Figure 6A:
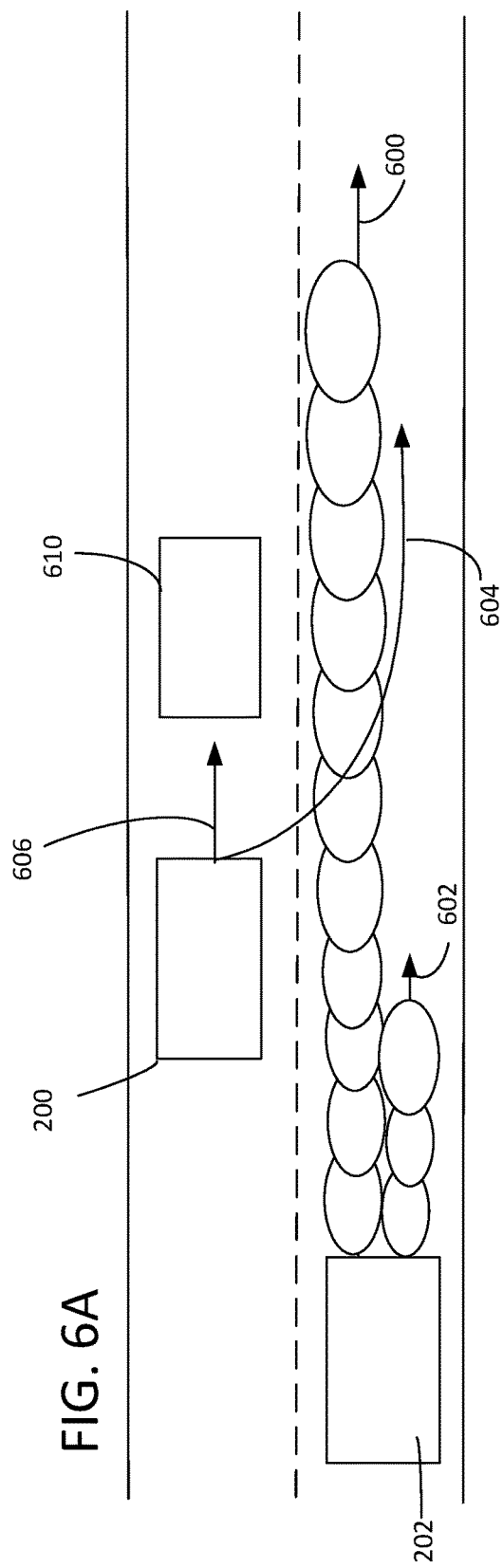
FIGS. 6A and 6B show an example simulation of a highway lane-change scenario.
Figure 6B:
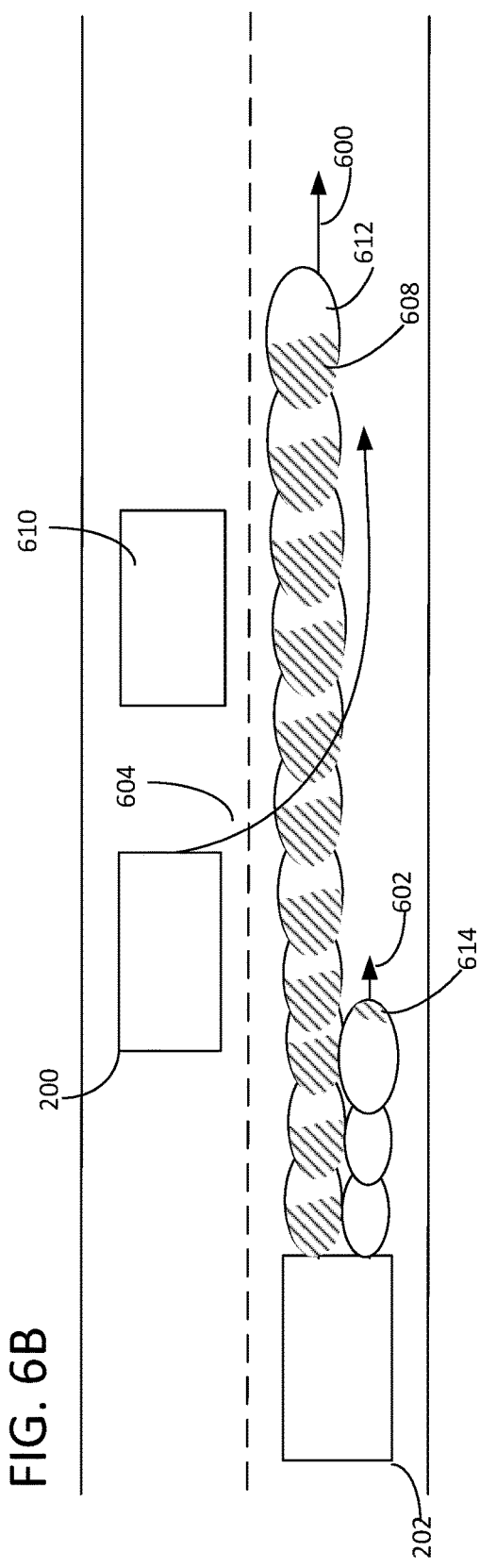

FIGS. 6A and 6B are described in detail below. For now, suffice it to say that FIG. 6A depicts a lane driving scenario, with two possible ego actions (i) at a particular point in time: a "follow lane" action 606 to stay in a current lane, and a "change lane" action 604 to move to an adjacent lane. FIG. 6B assumes the change lane ego action 602 has been selected, and depicts two agent behaviours (j) relevant to the change lane action 602. The latter are behaviours of another agent 202 in the adjacent lane: a "follow lane and accelerate" behaviour 600 and a "follow lane at constant speed" behaviour 602. In this example, the agent behaviours 600, 602 can be thought of as behaviour "classes" that each accommodate a range of possible agent trajectories. A trajectory is a sequence of states (typically position and motion) over time, over which some probability distribution (the 'natural' distribution) is provided by the prediction system 104. This is depicted highly schematically in FIGS. 6A and 6B as a sequence of 'blobs' associated with each ego action, with each blob 612 being a region representing the distribution over the other agent's state at different time instants. These 'blobs' are also referred to herein as 'footprints'. Reference numerals 608 and 614 denote subsets of agent states—associated with the first and second agent behaviours 600, 602 respectively—that are "high risk" from the perspective of the ego agent 200 when performing the change lane ego action 604, i.e. states that would lead to low reward outcomes for the change lane ego action 604 (e.g. a resulting in a collision between the ego agent 200 and the other agent 204 in the extreme case). In this example, in respect of the change lane ego action 604, the first agent behaviour 600 is considered higher risk than the second agent behaviour 602, because the former is more likely to result in a high risk agent trajectory than the latter. The importance sampling techniques described below aim to identify higher risk agent behaviours in the initial iterations of the search method, and bias the sampling of agent behaviours towards higher risk behaviours in subsequent iterations, with the aim of exploring more pessimistic agent behaviours that are still realistic. The concept of risk is tied to the ego action under consideration; if, instead of the change lane action 604, the follow lane ego action 602 were selected, the risk associated with the agent behaviours 602, 604 is much lower from the perspective of the ego agent 200 (in this case, the behaviour of a forward agent 610 in the ego lane becomes much more relevant).

The above algorithm samples a single agent behaviour from a distribution over agent behaviours. The example scenario described above described planning in the presence of a single agent. For scenes with multiple agents, each agent may be treated separately, with a separate distribution over agent behaviour. In this case, a behaviour for each agent of the scene may be sampled from its own importance distribution in the above algorithm. Alternatively, a distribution over agent behaviour may be computed where each behaviour defines a combination of agent actions for all the agents (or at least multiple agents) of the scene at once. Pairwise evaluation may be preferable, as it keeps the space relatively small, and therefore ensures the required computations remain tractable.

In the above, 'optimistically' is used to refer to an optimisation of a risk measure that is adjusted to favour those options which have been observed or sampled less often and thus for which the planner knows less about, to encourage exploration. In the final step, where the actual ego action is chosen, 'conservatively' refers to an optimisation of the risk measure that is adjusted to disfavour those options which are less known by the planner. That is, in sampling, the planner is encouraged to explore even if the explored ego actions may lead to higher risk values, whereas in the final decision, the knowledge of the planner is given priority, such that ego actions which have a low risk value based on a large number of previously observed rewards (i.e. with high confidence) may be chosen instead of the ego action with the lowest risk value, if that risk value is based on a smaller number of observed rewards. This optimistic and conservative optimisation may be achieved by applying upper confidence bounds and lower confidence bounds to the computed risk measure. The effect of upper and lower confidence bounds is described below with reference to FIGS. 5A and 5B.

The importance distribution may be updated after every iteration. In some embodiments, the distribution $Q_i(Z)$ over the set of agent behaviours Z for each possible ego action may be updated in 'batch', i.e. after simulating and evaluating that ego action some predetermined number of times.

The above algorithm differs from existing algorithms, such as the MCTS algorithm in Albrecht et. al, described above, as both the ego actions and the agent behaviours are chosen in planning with an awareness of risk to allow more efficient evaluation of the most important scenarios. Furthermore, in the above algorithm, the ego action is selected before the agent behaviours are sampled, since the distribution $Q_i$ over agent behaviours is dependent on the ego action.

Figures 5A, 5B:
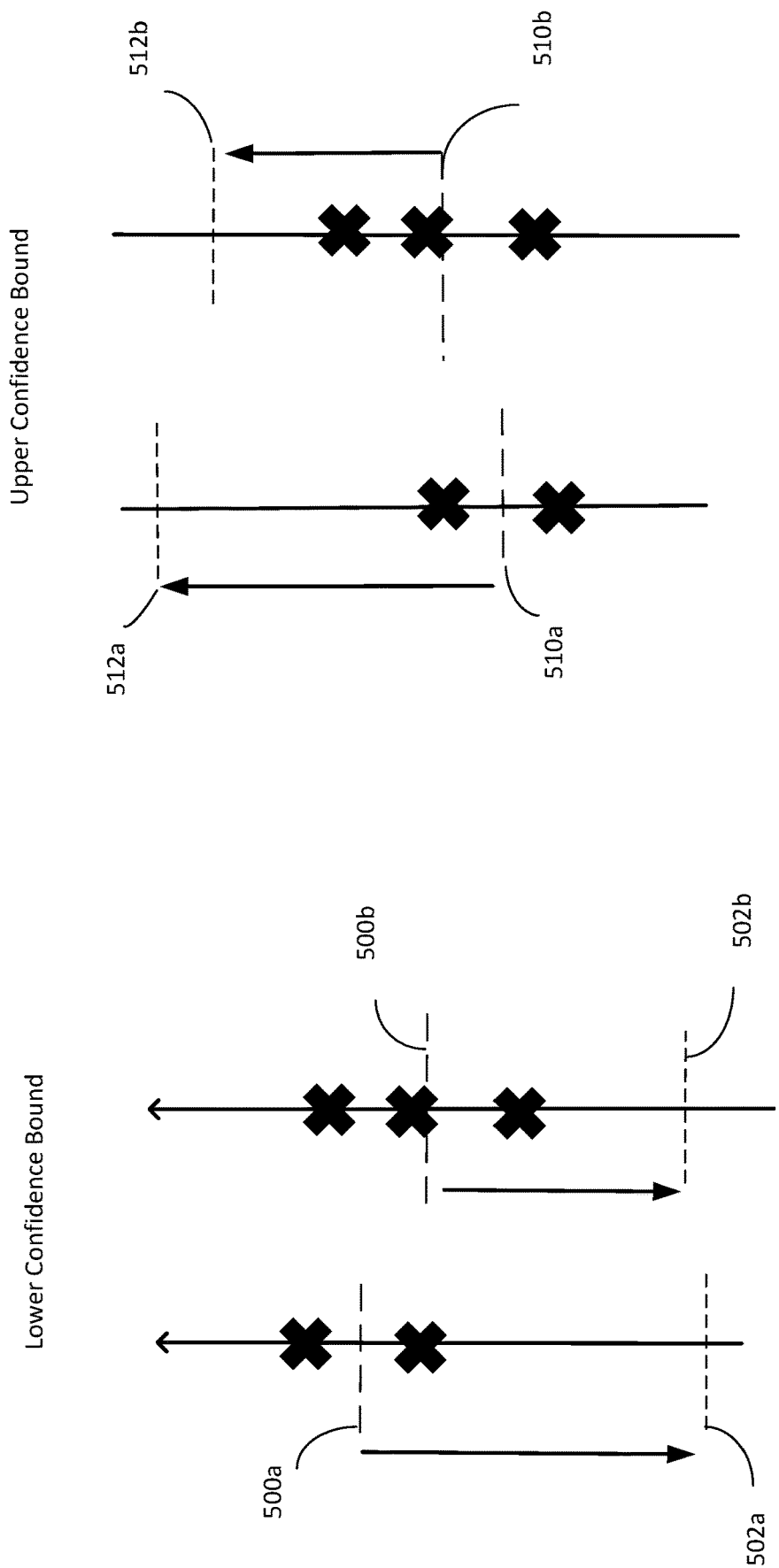
FIG. 5A shows an example graph showing the effect of lower confidence bounds.
FIG. 5B shows an example graph showing the effect of upper confidence bounds.

FIGS. 5A and 5B illustrate the effect of upper and lower confidence bounds applied to a statistic computed on a set of values representing some underlying distribution. In the example described below, the statistic is a risk metric computed based on a set of received rewards for a given ego action. However, for simplicity, FIGS. 5A and 5B illustrate the concept of upper and lower confidence bounds for the mean of a set of values sampled from respective underlying distributions.

FIG. 5A shows a simplified example two sets of values along an axis, each value sampled from an underlying distribution, and denoted by a cross. The set shown on the left comprises only two sampled values, with the mean of the set shown by a dashed line in between the two sampled values. On the right, a set of three points have been sampled. Their mean is shown by a second dashed line 500b. The lower confidence bound (LCB) on each mean is obtained by subtracting a term inversely proportional to the square root of the number of samples. This is a lower confidence bound for a mean, assuming the samples are normally distributed. This term may be adjusted by changing the value of a parameter c applied to scale the subtracted term, therefore controlling the degree of exploration or exploitation in the given search process. Since the right set has more samples, the confidence interval about the mean is narrower, and the lower confidence bound on the right, shown by the lower dashed line, is higher than the lower confidence bound for the left case, even though its mean is lower. Therefore, in the context of multi-armed bandits, evaluating the lower confidence bound of a statistic instead of the statistic itself has the effect of reducing the value of those options for which there is less information.

Similarly, two sets of samples are shown in FIG. 5B, with respective means 510a and 510b, where the left set has a lower mean than the right set. The upper confidence bound (UCB) of each mean is shown by dashed lines, 512a and 512b. As described above, the confidence interval is narrower for sets with more samples, so the upper confidence bound 512b is lower relative to the mean for the right set than the upper confidence bound 512a for the left set. As with LCB, the term added to the mean may be adjusted by changing the value of a parameter c, therefore controlling the degree of exploration or exploitation in the given search process.

In the present context, these upper and lower confidence bounds may be applied to any appropriate risk statistic to enable the planner to prioritise either exploitation of prior knowledge or exploration of other options depending on the context. As shown in the algorithm described below, the choice of ego actions in the sampling phase is an 'optimistic minimisation' achieved by applying LCB to the risk measure to lower the risk of those options which have been sampled less often to allow the planner an opportunity to explore these options. Under this measure, the planner would choose the option corresponding to the left set of values in FIG. 5A even though its mean is slightly higher. Similarly, when maximising risk in the prediction distribution Q, an upper confidence bound is applied to encourage sampling of agent behaviours which have not been sampled often previously. For example, the distribution Q, if computed using upper confidence bounds, would assign a higher probability to the behaviours associated with the left set of values than the probability for the behaviour associated with the right set of values.

The risk measure used both to choose the ego action and to define the distribution over agent behaviours may comprise a statistical measure computed based on the rewards received for those ego actions and agent behaviours. As described above, rewards may be defined based on many metrics which may be computed based on simulation of ego actions and agent behaviours and data received from the perception and prediction modules 102 and 104. An example statistical measure of risk that may be used by the planner to determine ego actions and agent behaviours is called 'conditional value at risk'. This is also known in some fields as 'expected shortfall', and is commonly used in the field of financial risk management. The conditional value at risk at 5% level, for example, is calculated for a given distribution of returns as the expected returns in the worst 5% of cases.

In the present context, the distribution over rewards for each ego action is not known, so instead the conditional value at risk may be computed at each iteration based only on the rewards received for that action in previous iterations. This estimated conditional value at risk (CVaR) may be computed as follows:

$$CVaR_i = \frac{1}{n_i(1-\alpha)} \sum_k w^{(k)} * r_i^{(k)} \mathbb{1}\{r_i^{(k)} \leq VaR_i\},$$

where $\alpha$ is the level of CVaR, for example 0.05, w is a likelihood ratio, $VaR_i$ is the value at risk, and the sum is computed over $n_i$ reward observations seen for the given ego action i up to the current iteration. The value at risk is the threshold reward value, below which are the worst $\alpha$ % of cases. This value may be computed by determining the $\alpha^{th}$ percentile of the rewards received so far. Methods for computing a percentile from a set of samples are known and will not be described in detail herein. $CVaR_i$ is therefore computed as a sum over the worst $\alpha$ % of rewards for the ego action i. The likelihood ratio $w^{(k)}$ is a ratio of the probability of the given agent behaviours sampled in the $k^{th}$ iteration under the natural distribution P(Z) received from the prediction module 104, and the 'risk-aware' importance distribution Q(Z) used for sampling, which is learned by the planner. This is to address the fact that the importance distribution itself provides a biased expectation value. This likelihood ratio weights the rewards to provide an unbiased estimate of the risk of ego actions under the natural distribution of agent behaviours, while agent behaviours are sampled from a distribution that maximises risk. The likelihood ratio is computed for each observed reward at each iteration of the above algorithm.

The quantity $CVaR_i$ is one example of an "ego score" according to the present terminology. This is merely one example, and an ego score can be defined in other ways.

Optionally, the above formula for CVaR may be weighted by a normalisation factor $1/\mu$, where $\mu$ is the sum of the likelihood ratio w for all sampled behaviours for the given ego action i.

In the above sum, the reward $r_i^k$ is the reward received for arm i at iteration k. Note that only a single ego action is chosen at each iteration, and the reward for all other arms is zero for that iteration. Therefore the above sum for each ego arm is computed as a weighted sum of rewards received at that arm, under the $\alpha$ % value at risk. The above sum includes rewards received by the arm i given any sampled agent behaviours.

At each iteration, only one ego action is chosen, a prediction of agent behaviours is sampled, and a reward is received. An updated estimate for that arm's CVaR may be computed by recomputing the above sum, now including the most recently received reward and the corresponding likelihood ratio computed for the sampled agent behaviours. The CVaR estimate for all other ego actions is not updated. The ego action at the next iteration is the one that directly minimises CVaR, or that 'optimistically' minimises CVaR by minimising an adjusted value of CVaR defined to encourage exploration of lesser-encountered options for which the system is not confident of their risk. An example adjustment of the CVaR is a lower confidence bound (LCB), described above. A term is subtracted from the CVaR value which is inversely related to the number of previous instances of that arm that have been encountered previously.

The lower confidence bound may be defined as follows:

$$LCB_i(CVaR_i) = CVaR_i - c\sqrt{\frac{\log(n)}{n_i}},$$

where c is a constant which tunes the level of exploration of the planner, n is the number of iterations which have elapsed so far, and $n_i$ is the number of iterations for which the ego action i has been selected so far. Minimising this measure to choose the next ego action instead of directly minimising the CVaR value means that an arm which has only been evaluated a small number of times is adjusted to receive a lower risk value and encourage the planner to explore outcomes for this arm more in future by minimising this adjusted risk value.

CVaR may also be used as the basis for the importance distribution Q(Z) from which agent behaviours are sampled. The distribution should be chosen such that riskier behaviours are sampled with higher probability than under the 'natural' prediction distribution P(Z). Thus, a sensible distribution may assign a probability to each agent behaviour that is correlated to a risk value computed for that behaviour, such as CVaR. A CVaR may be computed for each agent behaviour $z_j$, having chosen an ego arm i, as follows:

$$CVaR_{ij} = \frac{1}{n_{ij}(1-\alpha)} \sum_k w^{(k)} * r_{ij}^{(k)} \mathbb{1}\{r_{ij}^{(k)} \leq VaR_{ij}\},$$

where this risk estimation is computed as a sum only over of the worst $\alpha$ % of rewards for the given agent behaviour j and ego action i, and where $\alpha$ and $w^{(k)}$ are defined as above. This expression may also be normalised by a normalisation factor $\mu_{ij}$, defined above, where in this case $u_{ij}$ is the sum of likelihood ratios w for the selected ego action i and sampled agent behaviour j. This computes an expected value of the worst $\alpha$ % of rewards for the given agent behaviour j and ego action i. As described above, the rewards are determined by simulating the selected ego action and agent behaviour, with different possible rewards for the same i, j due to uncertainty in perception of agent and/or ego states. However, the distribution of rewards for a given (i, j) pair is unknown during planning, and at each search step a single reward is computed from a deterministic function of the simulated ego and agent actions, where the simulation itself may include one or more sources of uncertainty, such as perception uncertainty in the state of the other agents, and uncertainty in the location of the ego vehicle itself.

The quantity $CVaR_{i,j}$ is one example of an "agent-ego risk score" according to the present terminology. This is merely one example, and an agent-ego risk score can be defined in other ways.

In later embodiments, where the planner simulates a tree of depth greater than 1 comprising multiple ego actions into the future, this reward distribution is a distribution over possible aggregated rewards from the given ego action and sampled agent behaviours by following different possible paths along lower branches of the tree. This is described in more detail later.

Since the importance distribution is chosen to maximise the probability of riskier behaviours, the distribution Q may compute probabilities of each behaviour using an adapted form of CVaR using upper confidence bounds, i.e. where α term is added to the above expression which is larger for those behaviours that have not been sampled many times previously, and which are therefore more uncertain.

The upper confidence of $CVaR_{ij}$ may be defined as follows:

$$UCB_{ij}(CVaR_{ij}) = CVaR_{ij} + c\sqrt{\frac{\log(n_i)}{n_{ij}}},$$

where c is a constant which determines the degree of exploration, $n_i$ is the number of iterations in which the ego action i has been selected and $n_{ij}$ is the number of iterations for which the ego action i and agent behaviour j has been selected.

The distribution Q may also take into account the natural distribution P(Z) over agent behaviours, as received from the prediction module 104. A 'predictor' UCB (PUCB) may be computed for the CVaR given a natural distribution P(Z) according to the following formula:

$$PUCB_{ij} = CVaR_{ij} + cp_j \frac{\sqrt{n_i - n_{ij}}}{1 + n_{ij}},$$

where c is a constant which determines the degree of exploration, $p_j$ is the probability of the agent behaviour j according to the 'natural' distribution P, $n_i$ represents the number of iterations when ego has chosen action/decision i as in the $UCB_{ij}$ equation and $n_{ij}$ is the number of iterations when ego has chosen action i and the other agent's behaviour is j.

A possible definition of the importance distribution $Q_i$ for a given ego action i is as follows:

$$Q_i = Softmax(PUCB(CVaR_{ij}, P(Z)),$$

where the softmax converts the 'raw' PUCB values for each possible agent behaviour j to a probability. PUCB increases the CVaR measure according to the confidence of each agent behaviour's risk value to encourage exploration, while also taking the natural distribution P(Z) over agent behaviours into account.

Summarizing the above, suppose a particular ego action i=2 is selected in iterations k=2, 4, 5 and 7. In each of those iterations, an agent behaviour is sampled, an outcome of the selected ego action i=2 and sampled agent behaviour is simulated, and a reward $r_2^{(k)}$ is assigned to the ego action i=2 based on the simulated outcome. At this point, $CVaR_2$—the CVaR of ego action i=2—would depend on the sum of the worst 5% of rewards across iterations 2, 4, 5 and 7. Now suppose a particular agent action j=3 is sampled in iterations 4 and 7, and some other agent behaviour(s) is sampled in iterations 2 and 5. At this point, $CVaR_{2,3}$—the CVaR for the ego action-agent behaviour pair (i, j)=(2,3)—would depend on the sum of the worst 5% of rewards $r_{2,3}^{(k)}$ for k=4 and 7 only. Even though the same ego action-agent behaviour pairing is considered in those iterations, the rewards may be different because the outcome is not deterministic (uncertainty in the outcome, and therefore uncertainty in the reward, can arise in various ways, for example as a consequence of perception and/or prediction uncertainty; in the multi-level examples below, further decision point(s) are considered and uncertainty can arise from the backpropagation of rewards from the further decision point(s) whose outcomes are non-deterministic). Note that for early iterations, as in this example, the computed CVaR may not provide an accurate measure of risk due to the small sample size of rewards encountered. However, as more rewards are observed, a representative measure of the worst 5% of rewards can be determined. It will be appreciated that the instant example is provided mainly for the sake of illustration in any event. The "batch update" implementation considered below ensures that a sufficient sample size is reached before the threshold is estimated. As described in detail below, the extent to which the selection of ego actions is biased, in later iterations, towards or away from ego action i=2 depends on the LCB of $CVaR_2$, which quantifies how promising ego action j=2 is relative to other ego action(s) based on the evidence collected in the earlier iterations. When the same ego action i=2 is selected in later iterations, the extent to which the agent behaviour sampling is biased towards or away from j=3 would depend on the (P)UCB of $CVaR_{2,3}$, which quantifies the estimated level of risk that agent behaviour j=3 poses to the ego agent in the event ego action j=2 is chosen, based on the evidence of the earlier iterations.

Note that a predictor UCB is not the only choice of adjusted risk measure that may be used to compute the importance distribution Q. A simple UCB may instead be applied to the CVaR values to compute an importance distribution, without incorporating the 'natural' prediction distribution P(Z).

Note also that CVaR is only one of a plurality of statistical measures of risk which may be used to select ego actions and/or to define the importance distribution over agent behaviours. Other risk measures may be used, for example based on the mean of received rewards instead of CVaR. The risk measures used for ego actions and agent behaviours may be different, for example the ego actions may be based on mean rewards, while the importance distribution may be based on CVaR or VaR.

The importance distribution may be updated at each iteration to incorporate the most recent risk estimates. However, it may be inefficient to recompute the importance distribution for each small change to risk estimates for individual actions. A batch size may instead be defined, for example 100 iterations, after which a batch update is applied to the importance distributions for each ego action, based on the most recent risk measure estimations, described above for CVaR. As shown by the above pseudo code, the iterations continue, with ego actions and agent behaviours being simulated and evaluated until a planning budget is exhausted, at which point a final selection step is taken to decide the next ego action to be taken. When making the actual decision of which ego action to take, the risk measure of choice should be minimised conservatively, i.e. in a way that discourages choosing an action for which little information is known about its rewards. To apply this conservative risk minimisation, an upper confidence bound may be applied to add to the risk measure, such that those actions which were encountered less often in simulation are less likely to be selected in the final ego action selection. This achieves the opposite effect to applying a lower confidence bound to the value used to select ego actions for simulation and evaluation.

A self-normalized variant of importance sampling may be used to reduce variance. A normalisation factor $\mu$ may be computed based on the likelihood ratios w at each iteration, and applied to the CVaR estimate. This is useful to reduce variance, especially in the case that the importance distribution is updated at every iteration of the above algorithm. Self-normalised importance sampling is a known variation of importance sampling, and will not be described in detail herein.

Batch updates are also helpful in estimating the reward thresholds for the fifth percentile, as it ensures a sample size from which a reasonably accurate estimate of the fifth percentile can be made.

In the final step of the algorithm presented above, the planner chooses the ego action that minimises the upper confidence bound of the given risk measure. This has the opposite effect to that applied in the simulation phase. Instead of encouraging the planner to choose options for which there are fewer samples as in the simulation phase, using the upper confidence bound discourages choosing options that the planner is more uncertain about. This is used because when making real driving decisions, it is much more important that the planner is confident about avoiding risky outcomes. Taking the example of FIG. 5B, if the two sets represent risk values for different ego actions, the planner would choose the action corresponding to the set on the right, since, despite having a mean risk value slightly higher than the other action, the planner is more confident about the risk of that action.

FIGS. 6A and 6B show an ego vehicle 200 planning its actions in the presence of an agent 202 in a highway scenario, as described above. A possible action of the ego vehicle is to change lanes, which results in the ego vehicle 200 reaching the neighbouring lane within a particular time period, as shown by the trajectory 604. As described above, the possible decisions of the ego vehicle may be determined by a trajectory planner based on the physical constraints of the system as well as the goals of the ego vehicle, as determined by a goal generator. To evaluate this possible decision, the scenario is simulated for multiple sampled behaviours of the other agent 202. In the simplified example of FIG. 6A and FIG. 6B, the other agent is assumed to have two possible behaviours, shown by the respective longer and shorter arrows extending from the location of the agent 202. These represent the simulated behaviour of the agent within the same time period in which the ego value completes the action being evaluated. The longer agent path 600 therefore represents the agent continuing along its lane at a high speed, such that it reaches the final position in front of the ego vehicle before the ego vehicle completes the lane change. In the other possible agent behaviour 602 of this simplified scenario, the agent moves more slowly in its own lane, such that the ego vehicle changes lane in front of it.

As described above, an agent behaviour defines the behaviour of an agent over a particular time period. However, the actual path taken by the agent in simulation is subject to uncertainty. For example, a behaviour may define that the agent follows its current path with some acceleration a. For the assumed current state of the agent, this behaviour may fully define a trajectory for the agent. However, in simulation, the state of the agent is sampled taking errors in perception into account, so that trajectories for the agent may be evaluated for the given agent behaviour where the agent's position is slightly different to where it is observed by the ego stack. The agent behaviour may therefore be represented by an uncertainty distribution over actual agent states. This is shown in the simplified example of FIG. 6A by a set of 'footprints' of the agent along a trajectory representing the chosen behaviour. For each of the two possible behaviours, the actual state of the agent evaluated in simulation is selected from the footprints.

Rewards may be calculated based on the relative position, velocity, or other parameters of the ego vehicle 200 and agent 202, so as to reward driving that maintains a safe distance from other vehicles. Rewards may also take other factors such as comfort or progress into account. As mentioned above, there are multiple ways that rewards may be generated. The full ego decision of changing lanes along the path shown in FIG. 6 may be evaluated against each of the agent behaviours based only on the final position of the ego vehicle 200 and agent 202. Alternatively, the reward received for the ego action for the simulation of that action with each of the agent behaviours may be computed at multiple points along the simulation.

As mentioned above, the rewards received for each simulation are computed based on simulated ego and agent states. The agent states may be sampled from a distribution that considers errors or uncertainty in perception and prediction, as shown by the 'footprints' in FIG. 6A. The size of the footprints increases as the simulated scenario progresses, as the uncertainty in the velocity of the agent leads to a wider range of possible locations of the agent by the end of the ego action. Similarly, the state of the ego vehicle may also be subject to uncertainty in ego localisation.

As shown in FIG. 6B, each blob (footprint) of the agent behaviour 600 contains a shaded area which indicates the agent states which lead to worse rewards by a given reward metric. For this behaviour 600, where the agent is travelling at high speed along its current lane, the agent travelling slightly slower than perceived means that the position of the agent may be behind where it is observed by the ego vehicle, where this discrepancy may grow further down the path. If the simulated agent's position is in the shaded area of the footprints, this indicates that the ego vehicle and agent are not a safe distance apart. The rewards in this case will be lower to reflect the proximity of the vehicles being a safety risk.

For the agent behaviour 600, in which the agent continues along its current path at a slower speed, only a very small area at the front of the footprint is shaded to indicate that if the agent is travelling faster than perceived, there is a possibility of driving too close to the ego vehicle as it changes into the agent's current lane. However, overall this agent behaviour has a much lower chance of adverse outcomes, and therefore is a lower-risk agent behaviour overall.

In the example of FIG. 6A, the planner should evaluate the ego action 604 in order to decide whether to take this action. While only this ego action is shown in FIG. 6A, in reality the planner chooses from among a plurality of possible ego actions at any given planning step. For this ego action, the agent behaviours to be evaluated in simulation may be sampled from a distribution over agent behaviours, i.e. each of the agent behaviours 600 and 602 are associated with a probability based on the output of the prediction stack 104. In the case that the behaviour 602 is far more likely than the behaviour 600, it is possible that the risky outcomes associated with the comparatively rare agent behaviour 600 are not encountered in simulation in order to determine a fair measure of the overall risk of taking the ego action 604.

Therefore, a planning method may be used which samples agent behaviours instead from an importance distribution, rather than the 'natural' distribution over agent behaviours, to ensure that rare but high-risk agent behaviours such as the behaviour 602 in FIG. 6B are encountered in planning to the extent that ego decisions can be made with an awareness of most negative outcomes. Under an importance distribution, the chances of sampling the agent behaviour 600 are increased during the planning steps, so that the ego action 604 is evaluated in a robust way against the riskiest possible agent behaviours. This method is described in more detail below, with reference to FIG. 7.

As described above, the ego vehicle is evaluated against agent behaviours sampled from the set of possible agent behaviours and an optimal ego action is selected once a given planning budget has expired. For example in the case of FIG. 6B, the ego action 604 may be selected after evaluating this as the best ego action with respect to a chosen risk or reward metric. However, while the actor system 118 may immediately start to implement the selected ego action 604, the planner may be called at regular intervals, to evaluate a new set of possible ego actions at any point during the execution of the given action. The ego planner can therefore make decisions based on the best simulated ego actions as it goes along. The points at which the planner plans and selects an ego decision may be referred to as planning steps.

The above description of FIGS. 6A and 6B assumes the trajectory of the ego vehicle as it changes lane to represent a single ego action 604. A single ego action may alternatively be defined as a shorter portion of this example trajectory depending on the desired scope of the planner's simulation and evaluation. As described above, the planner may use a multi-armed bandit formulation which looks only at the next possible ego action, or a Monte Carlo Tree Search, which evaluates multiple possible branches, each comprising a sequence of ego actions and agent behaviours resulting from an immediate next action. The trajectory corresponding to a single ego action may vary in each case, for example, in FIG. 6A, a Monte Carlo Tree Search may be applied to an immediate next action comprising only a small portion of the trajectory shown in FIGS. 6A and 6B, for example the action to move from the ego vehicle's current position to the position of the forward vehicle 610. Each branch of the Monte Carlo Tree being evaluated may comprise a sequence of such actions, where the full trajectory shown in FIGS. 6A and 6B may, for example, be represented by one branch of the Monte Carlo tree. Alternatively, the full trajectory shown in FIGS. 6A and 6B may represent a single ego action and the Monte Carlo Tree Search may evaluate the action based on evaluating the sampled sequences of actions which may occur following this trajectory.

Figure 7:
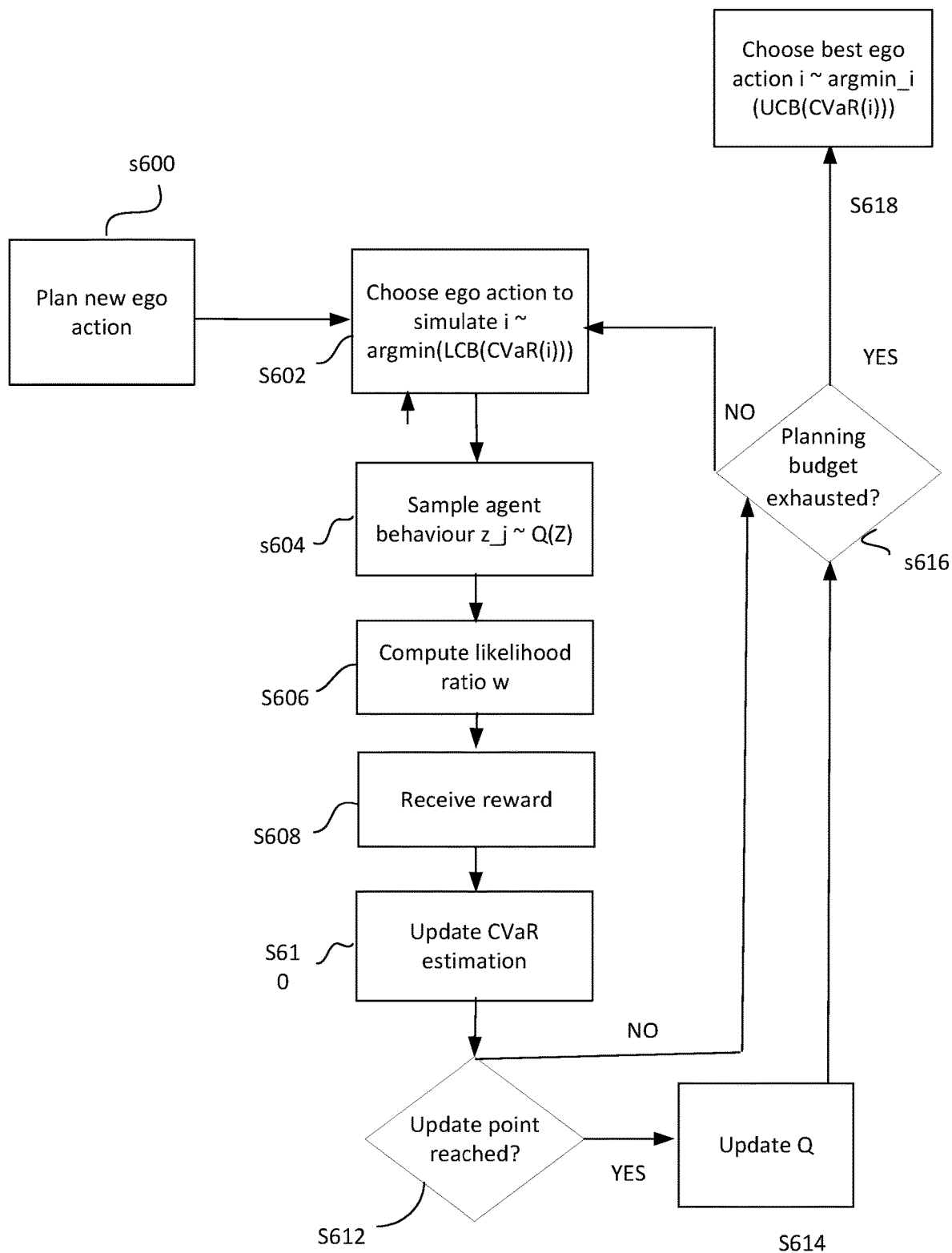
FIG. 7 is a flow chart showing the steps taken in the multi-armed bandit algorithm for planning an ego action.

FIG. 7 shows a flow chart diagram of the multi-armed bandit planning algorithm described above. At step S600, the planner is instructed to plan the next ego action. At step S602, the planner selects an ego action to simulate which minimises the lower confidence bound of the 5 CVaR risk measure. Note that at the first iteration, before any ego actions have been assessed, their respective risks and rewards may be unknown by the planner.

Once an ego action has been chosen, at step S604, the planner samples a behaviour for the external agents present in the scenario. This is sampled from the importance distribution Q(Z). Again, at the first iteration, since the risk of each behaviour is unknown, this distribution may be unknown and instead initialised, for example, as the natural prediction distribution P(Z). At step S606, the likelihood ratio $$w = \frac{p(z_j)}{q(z_j)}$$

for the sampled behaviour $z_j$ is computed. At step S608, a reward is received, based on the chosen ego action i and sampled agent behaviour $z_j$. As mentioned above, the reward is computed based on simulated ego and agent states, where the simulation may include perception and localisation error. Rewards are discussed in more detail below. After receiving the rewards, at step S610, the estimated $CVaR_i$ value for the given ego action i is updated based on the most recent reward and likelihood ratio. At the same step, the estimated $CVaR_{ij}$ value for the predicted behaviour $z_j$ is also updated. At step S612, where the importance distribution is updated in batch, the planner checks whether it has reached an update point (for example after 100 iterations). If the current iteration is an update point, the importance distribution Q(Z) is recomputed at step S614 based on the latest CVaR estimations before moving to step S616, otherwise the planner moves straight to step S616. At step S616, the planner checks whether it is still within budget. If there is still budget remaining, the planner repeats steps S602 to S614 as appropriate. Otherwise, the simulation phase is complete, and the planner proceeds to step S618, where the planner selects a next ego action by minimising the upper confidence bound of the estimated CVaR using the most recent estimates.

Note that the above description describes a method for selecting a next action for an ego vehicle to take. Once the planner has selected a next ego action, this information is passed to a controller which controls the ego vehicle to begin the given action. However, the planner may plan a next ego action while the ego vehicle is still executing the current action. The planner may be instructed to plan a next action according to its current state at regular intervals in time. These intervals do not necessarily correspond with the execution of a full action. Note also that exhaustion of the planning budget as shown in FIG. 7 may be defined by a fixed time period spent evaluating ego actions. This means that the ego vehicle may only partially complete a planned action before re-evaluating the available actions and selecting a new action. The frequency at which the planner is instructed to complete the steps shown in FIG. 7 may be configurable according to the resources or requirements of the given system.

Monte Carlo Tree Search Extension

The multi-armed bandit algorithm described above performs simulations for a next ego action and predicted agent behaviour. A reward is received based on simulation only of a next ego action and set of agent behaviours, where it is noted that the size of these actions can vary. However, as mentioned above, the planner may make decisions on ego actions by simulating actions and agent behaviours for multiple steps into the future, where a 'step' corresponds to a single ego action. In this case, the set of possible ego actions are evaluated based on a risk value computed not only based on a reward received for this immediate action over a sampled subset of concurrent agent behaviours, but based on a reward that accounts for the possible ego actions and agent behaviour that can follow the next ego action.

The outcomes of future actions and agent behaviours may be evaluated using a Monte Carlo tree search (MCTS). A detailed description of how Monte Carlo Tree Search may be applied may be found in Albrecht et al. 'Interpretable Goal-based Prediction and Planning for Autonomous Driving', which is hereby incorporated by reference in its entirety. Described below is a risk-aware planning method using MCTS to determine a next action for an ego vehicle. Note that an important difference between the algorithm described herein and the MCTS algorithm of Albrecht et al. is that in the present algorithm, the ego action at a given node of the tree must be selected before the agent behaviour is sampled, since the distribution used to sample the agent behaviour depends on the ego action, since each ego action is associated with a different risk in combination with the possible agent behaviours. By contrast, the algorithm of Albrecht et al. samples agent trajectories from a set of possible agent trajectories before selecting ego actions for simulation, since the sampling of agent trajectories has no dependence on ego actions.

A simplified version of a MCTS algorithm is shown below:

Perform K simulations:
  Search node=root node
  Search depth=0
  while not reached max depth:
    Select ego action i for ego vehicle from available actions
    Sample agent behaviour j from available agent behaviours
    Simulate ego action until max depth reached or terminal state
    Receive reward for simulated branch
  Select ego action i with optimal rewards As in the multi-armed bandit formulation, the planner may determine a best ego action by enumerating all possible paths within the tree. However, the number of possible paths within the tree may be very large, and increases with depth. Therefore, under limited resources, the planner must sample ego actions in a representative way using a sampling method such as Monte Carlo Tree Search.

As mentioned above, the number of choices to explore increases exponentially with the depth of the tree. It is important to note that, as discussed above, the planner may be called to evaluate next ego actions at regular time intervals. Each time the planner is called, the rewards computed previously are 'thrown out' as they are no longer relevant to the current state of the scenario. There is thus a trade-off in planning between considering the outcomes of events multiple steps into the future and ensuring that planning resources are used efficiently, where evaluating branches of actions far into the future requires considerably more resources than considering only the next action. The depth of the tree may be chosen, for example, based on the given resources.

Note that the ego actions described below are assumed to be 'open-loop' in that they do not receive or incorporate feedback from the environment to adjust the vehicle's behaviour. The given action fully defines the ego vehicle's behaviour, including velocity, acceleration, position, etc. for the duration of the action. This requires a greater number of possible ego actions to be considered at any given planning step. For example, multiple possible 'follow lane' actions may be defined and evaluated as distinct options, such as 'follow lane at constant speed', 'follow lane with constant deceleration', and 'follow lane with constant acceleration'. This is in contrast to a 'closed-loop' approach, in which the ego vehicle may adjust its specific behaviour within a given actions such as 'follow lane' due to environmental factors, for example by slowing down in response to other agents of the scenario. An open-loop approach is used to ensure that ego actions are searched so as to allow selection of specific ego actions for which the risk is known with reasonable confidence once simulation is complete, while a single closed-loop action comprises a wide range of possible ego trajectories and possible outcomes.

Figure 8:
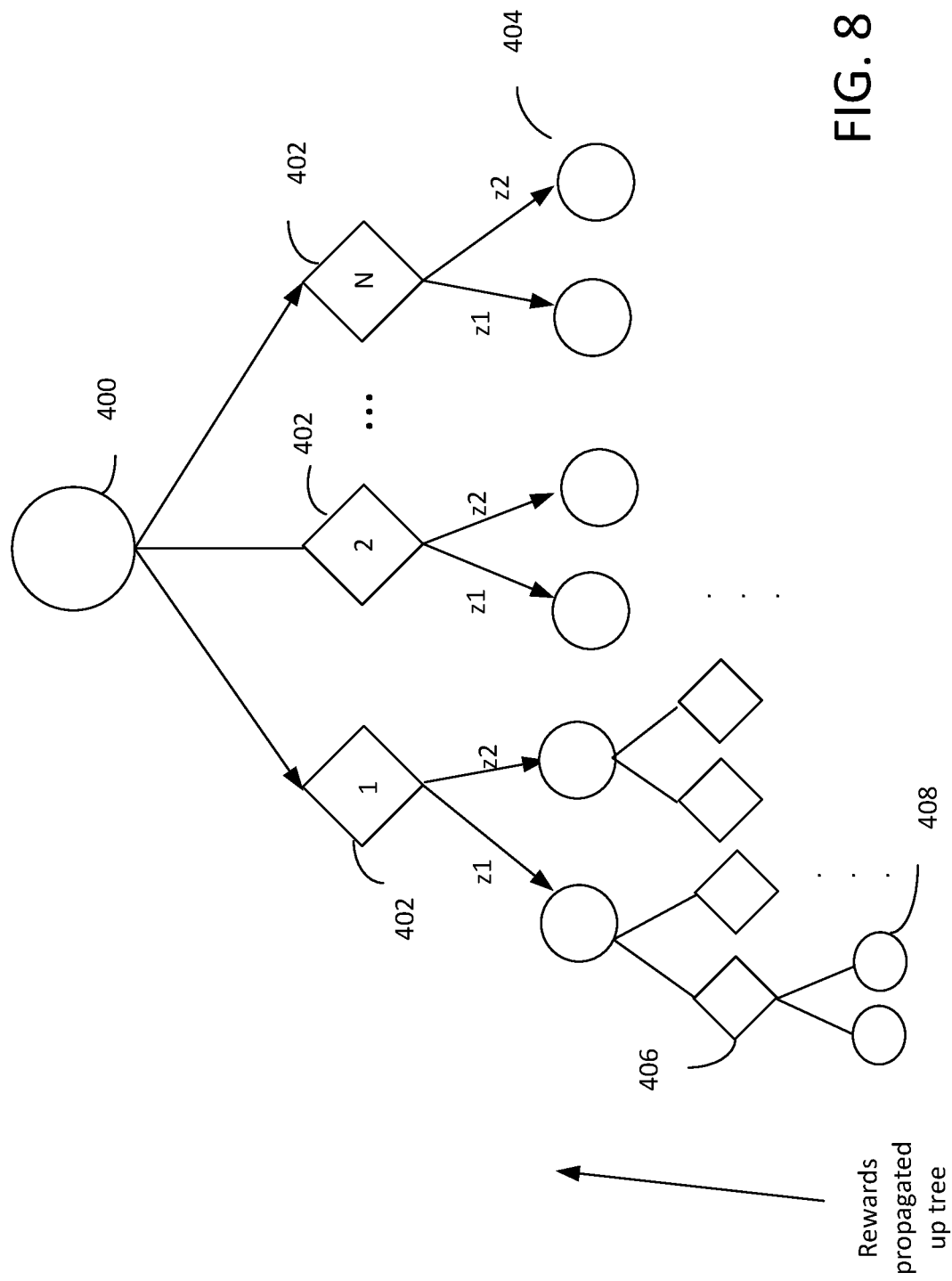
FIG. 8 shows an extension of the planning method to a Monte-Carlo Tree Search algorithm.

FIG. 8 shows how the multi-armed bandit structure described above may be extended to a tree structure. As in FIG. 4, the current ego state is shown by the node 400, with multiple possible ego actions 402 branching off from the current state. Agent behaviours may be sampled from a distribution over agent behaviours. At this point, instead of receiving a reward as in the multi-armed bandit of FIG. 4, the planner continues to simulate a subsequent ego action and predicted agent behaviour. The agent behaviours are sampled from an importance distribution Q for each ego action, ensuring that the planner encounters those agent behaviours that lead to the riskiest outcomes for the ego vehicle so that the planner decisions may avoid these outcomes and behaviours. After selecting an ego action and sampling agent behaviours, a reward may be received which is computed from the state of the scenario for the immediate next step, as in the multi-armed bandit case. However, the selection of the ego action by the planner is based on a reward function which aggregates rewards based on sampling branches of the tree representing a sequence of possible future ego actions.

Selection of ego actions continues down the nodes of the tree for a predetermined number of steps, up to a predetermined maximum search depth, or until a terminal ego state is reached, which may correspond to a goal of the ego vehicle provided by the goal generator, or a collision. After each ego action is selected, agent behaviours may be sampled for that ego action so as to maximise a risk score as in the multi-armed bandit example described above. Ego states 406 and agent behaviours 408 are shown for the next level of the tree in FIG. 8. In some embodiments, the agent behaviour may be sampled from an importance distribution at the root of the tree, with ego actions being selected at each node along a path of the tree. In this case, the importance distribution is based on a risk measure computed based on ego trajectories represented by a path of the tree.

For example, the present techniques can be implemented in an MCTS framework by traversing the whole tree before the behaviours of the other agents are sampled. In this case, the index i in $CVaR_{ij}$ would represent a path through the ego tree (sequence of ego actions) rather than a single ego action, and the number of reward observations becomes the number of times that ego action sequence i has been observed together with the agent behaviour j. Conceptually, the ego planning can be regarded as a tree but the prediction sampling is done as if it is a multi-armed bandit in this case, and prediction 104 need only be called once in the current real-world state (i.e. the root node of the tree) followed by passing the prediction output to planning 106 and fixing the prediction distribution(s) throughout the simulation phase of the planning.

While agent behaviours may be directly sampled from an importance distribution to be simulated with the selected ego action, importance distributions may also be used to sample higher-level agent decision-making for external agents, for example higher-level agent goals or actions spanning a longer time period than the agent behaviours described herein, with the agent behaviour corresponding to the same time period as the selected ego action being determined based on the sampled agent goal or trajectory. For example, an agent goal may be sampled from an importance distribution of the tree, with the actual behaviour of the agent simulated based on this goal. Ego actions may then be selected at multiple nodes of the tree representing future ego decisions, and rewards received based on the selected future actions, given the agent goal sampled at the root. The importance distribution over goals in this case is based on the rewards received for a given ego trajectory following a path of the tree.

A reward is received for the final ego state. Rewards may be propagated back up the tree based on those paths sampled so far to determine a reward associated with each initial ego action based on the rewards from all paths originating from that action. In FIG. 8, only terminal rewards computed for a final state of the scenario are shown, with these rewards being propagated up to the next ego actions. However, as stated above, each ego action may also be associated with reward values computed for the simulated state of the scenario after taking that action, as well as 'terminal' rewards received, for example, once an ego goal has been reached, a collision has occurred, or a maximum depth of the tree has been reached. The 'back-propagated' future rewards may be aggregated along with the immediate rewards of each ego action to obtain an overall reward for the selected ego action. Note that there are many ways to define rewards within the tree of future ego actions and the aggregated reward function may comprise immediate rewards, terminal rewards or a combination of rewards received along a path of the tree.

A reward $r_t$ is received which is associated with the selected next ego action 402, and the estimated risk metrics, such as CVaR, may be generated for ego actions at the first level of the tree in the same way as described above. Note that this is only one of multiple possible ways to receive rewards in a tree. In other embodiments, rewards may only be associated with terminal nodes, and the risk associated with a next ego action 402 is based on an aggregation of the terminal rewards of all sampled branches arising from that ego action. The reward $r_t$ for each ego action may be used to update the importance distribution from which agent behaviours are sampled for that ego action.

An autonomous vehicle, also known as a self-driving vehicle, refers to a vehicle which has a sensor system for monitoring its external environment and a control system that is capable of making and implementing driving decisions automatically using those sensors. This includes in particular the ability to automatically adapt the vehicle's speed and direction of travel based on inputs from the sensor system. A fully autonomous or "driverless" vehicle has sufficient decision-making capability to operate without any input from a human driver. However, the term autonomous vehicle as used herein also applies to semi-autonomous vehicles, which have more limited autonomous decision-making capability and therefore still require a degree of oversight from a human driver. Whilst AVs are considered in the above examples, the present planning techniques can be applied to other form of mobile robot.

In an "online" context, the runtime stack 160 of FIG. 1 is implemented by an on-board computer system of the AV (not shown). The on-board computer system comprises execution hardware which is configured to execute the method/algorithmic steps disclosed herein. The term execution hardware encompasses any form/combination of hardware configured to execute the relevant method/algorithmic steps. The execution hardware may take the form of one or more processors, which may be programmable or non-programmable, or a combination of programmable and non-programmable hardware may be used. Exampled of suitable programmable processors include general purpose processors based on an instruction set architecture, such as CPUs, GPUs/accelerator processors etc. Such general-purpose processors typically execute computer readable instructions held in memory coupled to the processor and carry out the relevant steps in accordance with those instructions. Other forms of programmable processors include field programmable gate arrays (FPGAs) having a circuit configuration programmable though circuit description code. Examples of non-programmable processors include application specific integrated circuits (ASICs). Code, instructions etc. may be stored as appropriate on transitory or non-transitory media (examples of the latter including solid state, magnetic and optical storage device(s) and the like).

The runtime stack 160 can also be implemented in an "off-board" computer system comprising similar processing hardware. For example, it may be applied to simulated inputs generated in a simulator for the purpose of safety and other performance testing. In an offline application, the planning techniques may or may not be performed in real time. For example, non-real time planning could be used to generate reference plans or trajectories, against which the performance of another real-time planner is assessed. In a simulation context, the actor system 112 may be replaced with a suitable robot dynamics model that simulates a realistic response to a received control signal.

Figure 9A:
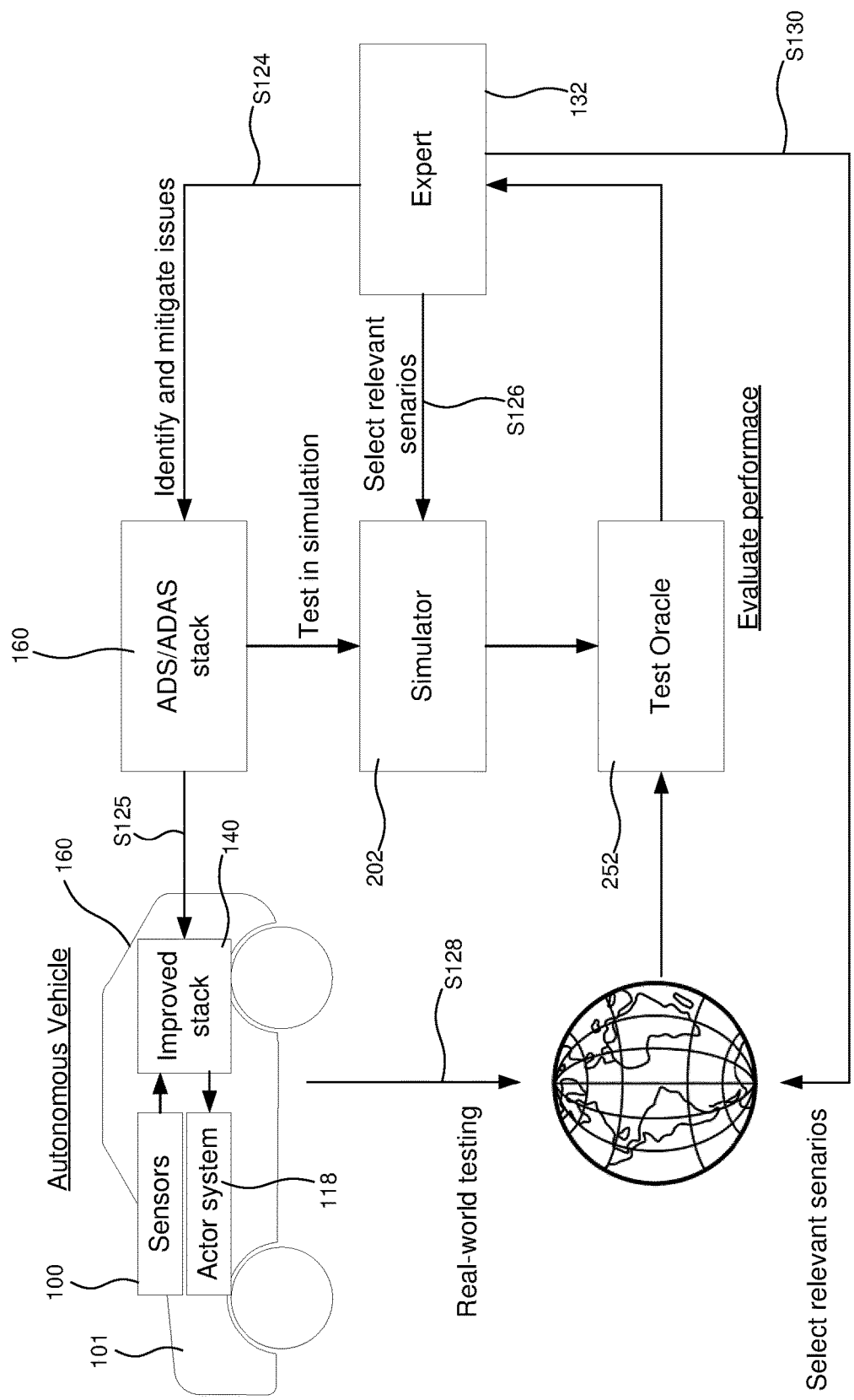
FIG. 9A shows a schematic overview of an autonomous vehicle testing paradigm.

FIG. 9A shows a highly schematic overview of a testing paradigm for autonomous vehicles. An ADS (Autonomous Driving System) or ADAS (Advanced Driver Assist System) stack 160, e.g. of the kind depicted in FIG. 1, is subject to repeated testing and evaluation in simulation, by running multiple scenario instances in a simulator 202, and evaluating the performance of the stack 160 (and/or individual sub-stacks thereof) in a test oracle 252. The output of the test oracle 252 is informative to an expert 132 (team or individual), allowing them to identify issues in the stack 160 and modify the stack 160 to mitigate those issues (S124). The results also assist the expert 132 in selecting further scenarios for testing (S126), and the process continues, repeatedly modifying, testing and evaluating the performance of the stack 160 in simulation. The improved stack 160 is eventually incorporated (S125) in a real-world AV 101, equipped with a sensor system 100 and an actor system 118. The improved stack 160 typically includes program instructions (software) executed in one or more computer processors of an on-board computer system of the vehicle 101 (not shown). The software of the improved stack is uploaded to the AV 101 at step S125. Step 125 may also involve modifications to the underlying vehicle hardware. On board the AV 101, the improved stack 160 receives sensor data from the sensor system 100 and outputs control signals to the actor system 118. Real-world testing (S128)

can be used in combination with simulation-based testing. For example, having reached an acceptable level of performance though the process of simulation testing and stack refinement, appropriate real-world scenarios may be selected (S130), and the performance of the AV 101 in those real scenarios may be captured and similarly evaluated in the test oracle 252.

Scenarios can be obtained for the purpose of simulation in various ways, including manual encoding. The system is also capable of extracting scenarios for the purpose of simulation from real-world runs, allowing real-world situations and variations thereof to be re-created in the simulator 202.

Figure 9B:
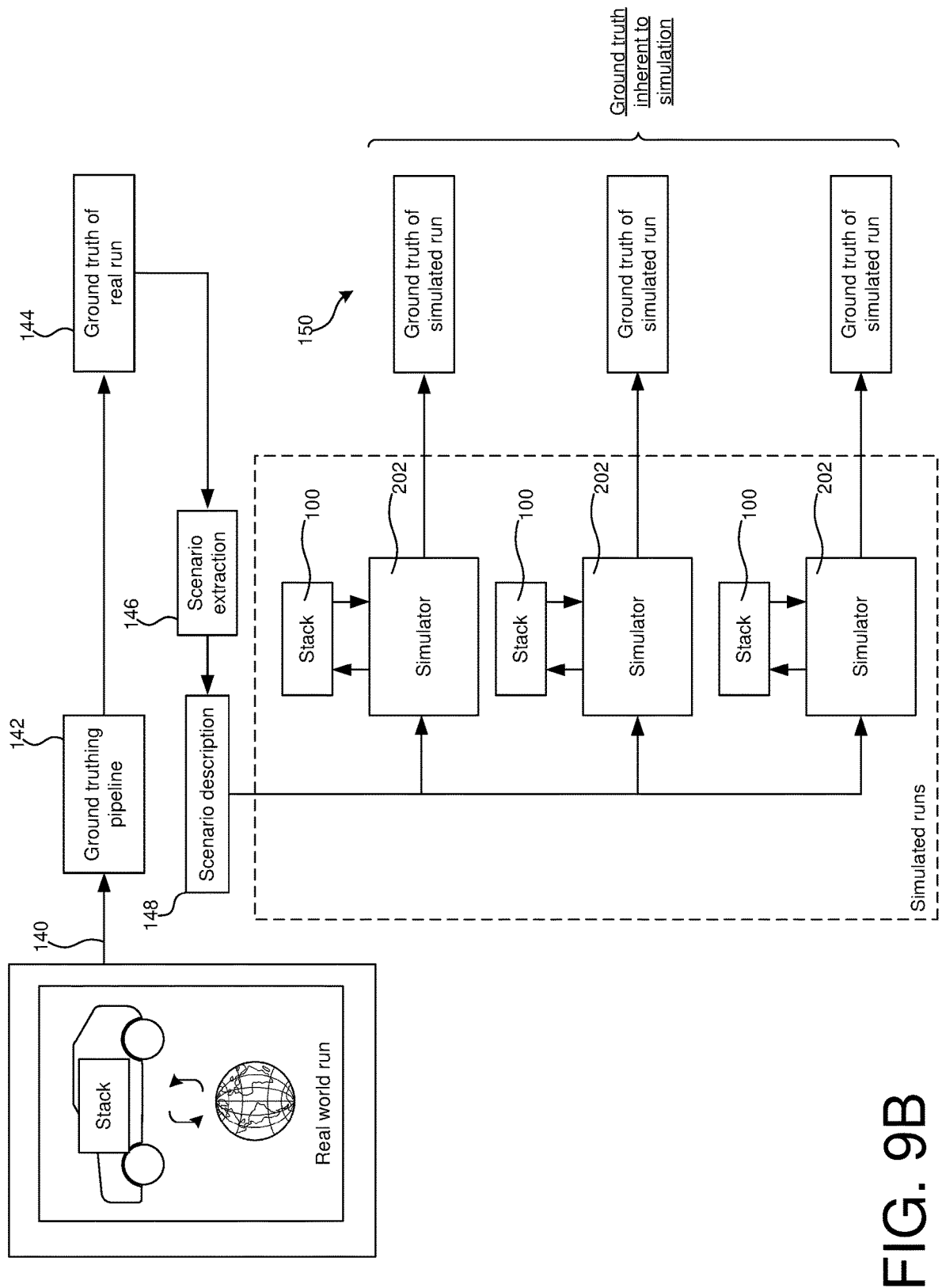
FIG. 9B shows a schematic block diagram of a scenario extraction pipeline.

FIG. 9B shows a highly schematic block diagram of a scenario extraction pipeline. Data 140 of a real-world run is passed to a 'ground-truthing' pipeline 142 for the purpose of generating scenario ground truth. The run data 140 could comprise, for example, sensor data and/or perception outputs captured/generated on board one or more vehicles (which could be autonomous, human-driven or a combination thereof), and/or data captured from other sources such external sensors (CCTV etc.). The run data is processed within the ground truthing pipeline 142, in order to generate appropriate ground truth 144 (trace(s) and contextual data) for the real-world run. The ground-truthing process could be based on manual annotation of the 'raw' run data 142, or the process could be entirely automated (e.g. using offline perception method(s)), or a combination of manual and automated ground truthing could be used. For example, 3D bounding boxes may be placed around vehicles and/or other agents captured in the run data 140, in order to determine spatial and motion states of their traces. A scenario extraction component 146 receives the scenario ground truth 144, and processes the scenario ground truth 144 to extract a more abstracted scenario description 148 that can be used for the purpose of simulation. The scenario description 148 is consumed by the simulator 202, allowing multiple simulated runs to be performed. The simulated runs are variations of the original real-world run, with the degree of possible variation determined by the extent of abstraction. Ground truth 150 is provided for each simulated run.

It will be appreciated that the above embodiments have been described by way of example only. Other variants or use cases of the disclosed techniques may become apparent to the person skilled in the art once given the disclosure herein. The scope of the disclosure is not limited by the described embodiments but only by the accompanying claims.

The invention claimed is:

1. A computer-implemented method of planning ego actions for a mobile robot in a presence of at least one dynamic agent, the method comprising:
   searching for an optimal ego action of a set of possible ego actions in multiple search steps, each search step comprising:
      selecting an ego action from the set of possible ego actions,
      selecting an agent behaviour from a set of possible agent behaviours,
      running an online simulation based on the selected ego action and agent behaviour, and thereby determining a possible outcome of the selected agent behaviour and ego action, and
      assigning at least one reward to the selected ego action, based on at least one reward metric applied to the determined outcome, wherein the selection of the ego action in later search steps is biased, based on the determined outcomes of earlier search steps, towards higher reward ego action(s) but the selection of the agent behaviour in the later search steps is biased towards riskier agent behaviour(s), a risky agent behaviour being an agent behaviour that is, according to the earlier search steps, more likely to result in a lower reward outcome for the selected ego action; and
   choosing an ego action of the set of possible ego actions, based on the rewards computed in the search steps.

2. The method of claim 1, wherein each agent behaviour is associated with an agent-ego risk score specific to the selected ego action, and the selection of the agent behaviour is biased towards riskier behaviour(s) according to the agent-ego risk scores specific to the selected ego action, the agent-ego risk score for each agent behaviour and ego action being updated based on further selection and simulation of that agent behaviour and that ego action in the later search steps.

3. The method of claim 2, wherein the selection of the ego action is biased towards higher reward ego action(s) based on an ego score, the ego score being updated based on further selection and simulation of that ego action in the later search steps.

4. The method of claim 3, wherein a lower confidence bound of the ego score is used to bias the selection of ego actions towards those actions which were selected less often in previous search steps.

5. The method of claim 3, wherein the agent-ego risk score and the ego score are each updated based on a same reward.

6. The method of claim 3, wherein the agent-ego risk score is updated based on a first reward computed using a first reward metric and the ego score is updated based on a second reward computed using a second reward metric.

7. The method of claim 5, wherein the selection of the agent behaviour comprises sampling a behaviour from an importance distribution over the set of possible agent behaviours, the importance distribution biased such that riskier behaviours are more likely to be sampled; and
   wherein the ego score is updated as:

$$CVaR_i = \frac{1}{n_i(1-\alpha)} \sum_k w^{(k)} * r_i^{(k)} \mathbb{1}\{r_i^{(k)} \leq VaR_i\},$$

where $\alpha$ is a predetermined percentile, $VaR_i$ is a reward threshold for the ego score, $w^{(k)}$ is a ratio of probabilities of the agent behaviours sampled in the $k^{th}$ search step under a natural distribution and the importance distribution, respectively, $r_i^{(k)}$ is a second reward, $n_i$ is a number of reward observations for i, and $\Sigma_k()$ is a sum over all reward observations for i.

8. The method of claim 5, wherein the selection of the agent behaviour comprises sampling a behaviour from an importance distribution over the set of possible agent behaviours, the importance distribution biased such that riskier behaviours are more likely to be sampled; and
   wherein the agent-ego risk score is updated based on an expression:

$$CVaR_{ij} = \frac{1}{n_{ij}(1-\alpha)} \sum_k w^{(k)} * r_{ij}^{(k)} \mathbb{1}\{r_{ij}^{(k)} \leq VaR_{ij}\},$$

wherein $r_{ij}^{(k)}$ is a first reward, which may or may not be equal to a second reward $r_i^{(k)}$, $n_{ij}$ is a number of reward observations for i, j, and $VaR_{ij}$ is a reward threshold, and $\Sigma_k()$ is a sum over all reward observations for i, j.

9. The method of claim 6, wherein the first reward metric measures at least collision risk, and the second reward metric measures at least one additional factor such as comfort or progress towards a defined goal.

10. The method of claim 2, wherein an upper confidence bound of the agent-ego risk score is used to bias the selection of agent behaviours towards those behaviours that were selected less often in previous search steps.

11. The method of claim 2, wherein the selection of the agent behaviour comprises sampling a behaviour from an importance distribution over the set of possible agent behaviours, the importance distribution biased such that riskier behaviours are more likely to be sampled.

12. The method of claim 11, further comprising determining a prediction distribution over possible agent behaviours, wherein the importance distribution is based on the prediction distribution and the agent-ego risk scores for the set of possible agent behaviours.

13. The method of claim 2, wherein batch updates are applied to the ego score, each batch update taking into account multiple search steps.

14. The method of claim 11, wherein different rewards are assigned, in different search steps, to a same ego action for a same sampled agent behaviour, as a consequence of prediction uncertainty and/or perception uncertainty.

15. The method of claim 11, wherein the reward additionally depends on a further ego action selected in the search step and/or a further agent behaviour sampled in the search step, whereby different rewards may be assigned, in different search steps, to a same ego action for a same sampled agent behaviour as a consequence of selecting different further ego actions and/or sampling different further agent behaviours.

16. The method of claim 15, wherein the reward is assigned based on backpropagation, wherein the backpropagation comprises aggregating rewards based on the further ego actions and/or further agent behaviours and propagating the aggregated reward to the selected ego action.

17. The method of claim 1, wherein the selection of the ego action in the selection step is biased towards ego actions observed more often in the search steps, by minimizing an upper confidence bound of a risk score for a respective ego action based on the at least one reward computed for the respective ego action.

18. The method of claim 1, comprising:
providing the chosen ego action, to a controller and generating, by the controller, a control signal for implementing the chosen ego action, wherein the control signal is inputted to an actor system of a mobile robot or a vehicle dynamics model for modelling a response of a mobile robot to the control signal in simulation.

19. A computer system comprising one or more computers configured to implement a method of planning ego actions for a mobile robot in a presence of at least one dynamic agent, the method comprising:
searching for an optimal ego action of a set of possible ego actions in multiple search steps, each search step comprising:
selecting an ego action from the set of possible ego actions,
selecting an agent behaviour from a set of possible agent behaviours,
running an online simulation based on the selected ego action and agent behaviour, and thereby determining a possible outcome of the selected agent behaviour and ego action, and
assigning at least one reward to the selected ego action, based on at least one reward metric applied to the determined outcome, wherein the selection of the ego action in later search steps is biased, based on the determined outcomes of earlier search steps, towards higher reward ego action(s) but the selection of the agent behaviour in the later search steps is biased towards riskier agent behaviour(s), a risky agent behaviour being an agent behaviour that is, according to the earlier search steps, more likely to result in a lower reward outcome for the selected ego action; and
choosing an ego action of the set of possible ego actions, based on the rewards computed in the search steps.

20. A non-transitory computer readable medium storing a computer program comprising a plurality of sets of computer readable instructions, which when executed by a plurality of processors cause performance of a method of planning ego actions for a mobile robot in a presence of at least one dynamic agent, the method comprising:
searching for an optimal ego action of a set of possible ego actions in multiple search steps, each search step comprising:
selecting an ego action from the set of possible ego actions,
selecting an agent behaviour from a set of possible agent behaviours,
running an online simulation based on the selected ego action and agent behaviour, and thereby determining a possible outcome of the selected agent behaviour and ego action, and
assigning at least one reward to the selected ego action, based on at least one reward metric applied to the determined outcome, wherein the selection of the ego action in later search steps is biased, based on the determined outcomes of earlier search steps, towards higher reward ego action(s) but the selection of the agent behaviour in the later search steps is biased towards riskier agent behaviour(s), a risky agent behaviour being an agent behaviour that is, according to the earlier search steps, more likely to result in a lower reward outcome for the selected ego action; and
choosing an ego action of the set of possible ego actions, based on the rewards computed in the search steps.

* * * * *